(12) United States Patent
Tsang

(10) Patent No.: US 9,507,321 B2
(45) Date of Patent: Nov. 29, 2016

(54) CONVERTING COMPLEX HOLOGRAMS TO PHASE HOLOGRAMS

(71) Applicant: City University of Hong Kong, Kowloon (HK)

(72) Inventor: Peter Wai Ming Tsang, Kowloon (HK)

(73) Assignee: CITY UNIVERSITY OF HONG KONG, Kowloon (HK)

(*) Notice: Subject to any disclaimer, the term of this patent is extended or adjusted under 35 U.S.C. 154(b) by 295 days.

(21) Appl. No.: 14/029,144

(22) Filed: Sep. 17, 2013

(65) Prior Publication Data

US 2015/0077818 A1  Mar. 19, 2015

(51) Int. Cl.
  *G03H 1/08* (2006.01)
  *G02B 5/32* (2006.01)
  *G03H 1/22* (2006.01)

(52) U.S. Cl.
  CPC .......... *G03H 1/0841* (2013.01); *G03H 1/0808* (2013.01); *G03H 1/2294* (2013.01); *G03H 2001/085* (2013.01); *G03H 2210/30* (2013.01)

(58) Field of Classification Search
  CPC .... G03H 1/2294; G03H 1/0808; G03H 1/08; G03H 2210/30; G03H 1/02; G03H 1/0866; G03H 1/0891; G03H 2001/085; G03H 2225/55
  USPC .......................... 359/9, 2, 15, 21, 11, 10, 35
  See application file for complete search history.

(56) References Cited

U.S. PATENT DOCUMENTS 5,194,971 A  3/1993 Haines
5,483,364 A  1/1996 Ishimoto et al.
(Continued)

FOREIGN PATENT DOCUMENTS

CN 102087503 A 6/2011
CN 102087503 B 7/2012
(Continued)

OTHER PUBLICATIONS

Tashima, et al., "Known plaintext attack on double random phase encoding using fingerprint as key and a method for avoiding the attack," Jun. 21, 2010 / vol. 18, No. 13 / Optics Express / pp. 13772-13781.
Peng, et al. "Known-plaintext attack on optical encryption based on double random phase keys," Optics Letters / vol. 31, No. 8 / Apr. 15, 2006 / pp. 1044-1046.
(Continued)

*Primary Examiner* — Jade R Chwasz
(74) *Attorney, Agent, or Firm* — Amin, Turocy & Watson, LLP

(57) ABSTRACT

Fast processing of information represented in digital holograms is provided to facilitate converting a complex Fresnel hologram into a single phase-only hologram, which can be called a bidirectional error diffusion (BERD) hologram, for displaying 3-D holographic images representative of a 3-D object scene on a display device. The BERD hologram can be capable of representing a 3-D object scene and preserving favorable visual quality on the reconstructed holographic image. A holographic generator component (HGC) can receive or generate a complex Fresnel hologram representing a 3-D object scene. The HGC can directly apply the BERD process to the complex Fresnel hologram to facilitate converting the complex Fresnel hologram into a phase-only hologram. Alternatively, the HGC can directly apply a unidirectional error diffusion process to the complex Fresnel hologram to facilitate converting the complex Fresnel hologram into a phase-only hologram.

15 Claims, 15 Drawing Sheets

(56) References Cited

U.S. PATENT DOCUMENTS

| | | | |
|---|---|---|---|
| 5,696,601 A | | 12/1997 | Metcalfe et al. |
| 5,974,228 A | * | 10/1999 | Heitsch ............... H04N 1/4052 358/1.16 |
| 7,088,480 B1 | | 8/2006 | Javidi et al. |
| 7,212,630 B2 | | 5/2007 | Javidi |
| 7,221,760 B2 | | 5/2007 | Javidi et al. |
| 8,150,033 B2 | | 4/2012 | Javidi et al. |
| 8,274,705 B2 | | 9/2012 | Chang |
| RE43,707 E | | 10/2012 | Kimpe et al. |
| 8,320,694 B2 | | 11/2012 | Chang |
| 8,384,973 B2 | | 2/2013 | Leister |
| 8,654,048 B2 | | 2/2014 | Collings et al. |
| 2005/0122549 A1 | | 6/2005 | Goulanian et al. |
| 2006/0001921 A1 | * | 1/2006 | Bailey .................... H04N 1/401 358/504 |
| 2006/0078113 A1 | | 4/2006 | Javidi |
| 2007/0024999 A1 | * | 2/2007 | Crossland ............ G03H 1/0808 359/859 |
| 2007/0086662 A1 | | 4/2007 | Cho et al. |
| 2008/0218864 A1 | | 9/2008 | Javidi |
| 2009/0002787 A1 | | 1/2009 | Cable et al. |
| 2009/0207466 A1 | | 8/2009 | Bucklay |
| 2009/0219380 A1 | | 9/2009 | Cable |
| 2010/0085276 A1 | | 4/2010 | Cable |
| 2010/0149139 A1 | | 6/2010 | Kroll et al. |
| 2011/0228365 A1 | | 9/2011 | Tsang et al. |
| 2011/0261427 A1 | | 10/2011 | Hart et al. |
| 2012/0008181 A1 | | 1/2012 | Cable et al. |
| 2013/0265623 A1 | * | 10/2013 | Sugiyama .......... G02B 27/0172 359/13 |
| 2016/0110564 A1 | | 4/2016 | Tsang |

FOREIGN PATENT DOCUMENTS

| | | |
|---|---|---|
| CN | 103279916 A | 9/2013 |
| WO | 2005059660 | 6/2005 |
| WO | 2005059881 A2 | 6/2005 |
| WO | 2006134404 A1 | 12/2006 |

OTHER PUBLICATIONS

Situ, et al., "Double random-phase encoding in the Fresnel domain," Optics Letters / vol. 29, No. 14 / Jul. 15, 2004 / pp. 1584-1586.
Refregier, et al. "Optical image encryption based on input plane and Fourier plane random encoding," Apr. 1, 1995 / vol. 20, No. 7 / Optics Letters / pp. 767-769.
Unnikrishnan, et al. "Optical encryption by double-random phase encoding in the fractional Fourier domain," Jun. 15, 2000 / vol. 25, No. 12 / Optics Letters / pp. 887-889.
ISO/IEC. "Information technology—Automatic identification and data capture techniques—QR Code 2005 bar code symbology specification" ISO/IEC 18004: Second Edition—Sep. 1, 2006, Retrieved on Jan. 16, 2015, 124 pages.
Ren, et al. "Secure and noise-free holographic encryption with a quick-response code," Chin. Opt. Lett. 12, Jan. 10, 2014, 4 pages.
Barrera, et al., "Optical encryption and QR codes: Secure and noise-free information retrieval," Mar. 11, 2013 / vol. 21, No. 5 / Optics Express / pp. 5373-5378.
Zhang, et al. "Vulnerability to chosen-plaintext attack of a general optical encryption model with the architecture of scrambling-then-double random phase encoding," Optics Letters / vol. 38, No. 21 / Nov. 1, 2013, pp. 4506-4509.
Frauel, et al., "Resistance of the double random phase encryption against various attacks," Aug. 6, 2007 / vol. 15, No. 16 / Optics Express /pp. 10253-10265.
Carnicer, et al. "Vulnerability to chosen-cyphertext attacks of optical encryption schemes based on double random phase keys," Optics Letters / vol. 30, No. 13 / Jul. 1, 2005 / pp. 1644-1646.
Gong, et al. "Multiple-image encryption and authentication with sparse representation by space multiplexing," Applied Optics, vol. 52, No. 31, Nov. 1, 2013, pp. 7486-7493.
Chen, et al. "Optical color image encryption based on Arnold transform and interference method", Optics Communications 282 (2009) pp. 3680-3685.
Chen, et al. "Double random phase encoding using phase reservation and compression", J. Opt. 16 (2014) 025402 (7pp).
Wikipedia. "Floyd-Steinberg Dithering" published online at [http://en.wikipedia.org/wiki/Floyd%E2%80%93Steinberg_dithering], last modified on Oct. 23, 2014, retrieved on Feb. 4, 2015, 2 pages.
Tsang, et al. "Novel method for converting digital Fresnel hologram to phase-only hologram based on bidirectional error diffusion", Optics Express, Oct. 7, 2013, 7 pages.
Tudela et al. "Full complex Fresnel holograms displayed on liquid crystal devices." Journal of Optics A: Pure and Applied Optics, Institute of Physics Publishing, J. Opt. A: Pure Appl. Opt. 5 (2003), Jan. 17, 2003, S1-S6.
Hsieh et al. "Improvement of the complex modulated characteristic of cascaded liquid crystal spatial light modulators by using a novel amplitude compensated technique." OE Letters, Optical Engineering, Jul. 2007/vol. 46(7), Jul. 2, 2007, 3 pages.
Makowski et al "Complex light modulation for lensless image projection." Chinese Optics Letters, col. 9 (12), 120008(2011), Dec. 10, 2011, 3 pages.
Hsueh et al. "Computer-generated double-phase holograms." Appl. Opt. 17, 3874-3883 (1978).
Reichelt et al. "Full-range, complex spatial light modulator for real-time holography." Optics Letters vol. 37, No. 11, Jun. 1, 2012, pp. 1955-1957.
Li et al. "Color holographic display using a phase-only spatial light modulator." Digital Holography and 3D Imaging, Technical Digest, Apr. 21-25, 2013, 3 pages.
Song et al. "Optimal synthesis of double-phase computer generated holograms using a phase-only spatial light modulator with grating filter." Optics Express vol. 20, No. 28, Dec. 31, 2012, 10 pages.
Liu et al. "Complex Fresnel hologram display using a single SLM," Applied Optics, vol. 50, No. 34, Dec. 1, 2011, pp. 128-135.
Weng et al. "Generation of real-time large computer generated hologram using wavefront recording method." Optics Express, vol. 20, No. 4, Feb. 13, 2012, pp. 4018-4023.
Tsang et al. "Holographic video at 40 frames per second for 4-million object points." Optics Express, vol. 19, No. 16, Aug. 1, 2011, pp. 15205-15211.
Gerchberg et al. "A Practical Algorithm for the Determination of Phase from Image and Diffraction Plane Pictures." OPTIK, vol. 35 (No. 2), Received Nov. 29, 1971, pp. 237-246.
Yeom et al. "Phase-only hologram generation based on integral imaging and its enhancement in depth resolution." Chinese Optics Letters, col. 9(12), Dec. 10, 2011, 4 pages.
Edward Buckley. "Holographic Laser Projection Technology." SID International Symposium Digest of Technical Papers 2008, pp. 1074-1079.
Cable et al. "Real-time Binary Hologram Generation for High-quality Video Projection Applications." SID International Symposium Digest of Technical Papers 2004, pp. 1431-1433.
Edward Buckley. "Real-Time Error Diffusion for Signal-to-Noise Ratio Improvement in a Holographic Projection System." Journal of Display Technology, vol. 7, No. 2, Feb. 2011, pp. 70-76.
Office Action for U.S. Appl. No. 14/516,332 dated Feb. 16, 2016, 54 pages.
Tsang et al. "Fast conversion of digital Fresnel hologram to phase-only hologram based on localized error diffusion and redistribution," Opt. Express 22, pp. 5060-5066 (2014). Retrieved on Mar. 26, 2016, 7 pages.
Office Action dated Apr. 1, 2016 for U.S. Appl. No. 14/076,717, 44 pages.
Office Action dated Aug. 23, 2016 for U.S. Appl. No. 14/305,494, 112 pages.
Cathey, Jr., "Phase Holograms, Phase-Only Holograms, and Kinoforms", Dec. 1969. Retrieved on Aug. 23, 2016, 2 pages.
Falou, et al. "Segmented phase-only filter binarized with a new error diffusion approach", Journal of Optics A: Pure and Applied Optics, Feb. 11, 2005. Retrieved on Aug. 23, 2016, 10 pages.
Kiire, et al. "Three-dimensional displacement measurement for diffuse object using phase-shifting digital holography with polar-

(56) References Cited

OTHER PUBLICATIONS ization imaging camera", Optical Society of America, Dec. 1, 2011. Retrieved on Aug. 23, 2016, 6 pages.

Tsang, "Novel method for converting digital Fresnel hologram to phase-only hologram based on bidirectional error diffusion", Optics Express, Sep. 27, 2013. Retrieved on Aug. 23, 2016, 7 pages.

Knuth, "Digital Halftones by Dot Diffusion", ACM Transactions on Graphics, vol. 6, No. 4, Oct. 1987. Retrieved on Aug. 23, 2016, 29 pages.

Yagle, "Complex Numbers And Phasors", The University of Michigan, Ann Arbor, Fall 2005. Retrieved on Aug. 23, 2016, 7 pages.

Kirk, et al. "A generalisation of the error diffusion method for binary computer generated hologram design", Optics Communications 92 (1992) 12-18. Retrieved on Aug. 23, 2016, 8 pages.

Yeom, et al. "Phase-only hologram generation based on integral imaging and its enhancement in depth resolution", Chinese Optics Letters, Dec. 10, 2011. Retrieved on Aug. 23, 2016, 4 pages.

Office Action dated Sep. 19, 2016 for U.S. Appl. No. 14/516,332, 57 pages.

* cited by examiner

CONVERTING COMPLEX HOLOGRAMS TO PHASE HOLOGRAMS

TECHNICAL FIELD

The subject disclosure relates generally to holograms, e.g., to converting complex holograms to phase holograms.

BACKGROUND

With the advancement of computers, digital holography has become an area of interest and has gained popularity. Research findings derived from this technology can enable digital holograms to be captured optically or generated numerically, and to be displayed with holographic display devices such as a liquid crystal on silicon (LCoS) display device or a spatial light modulator (SLM) display device. Holograms generated in this manner can be in the form of numerical data that can be recorded, transmitted, and processed using digital techniques. On top of that, the availability of high capacity digital storage and wide-band communication technologies also lead to the emergence of real-time video holography, casting light on the future of, for example, a three-dimensional (3-D) television system.

A Fresnel hologram of a 3-D scene can be generated numerically by computing the fringe patterns emerged from each object point to the hologram plane. The Fresnel hologram of the 3-D scene can be used to reconstruct and display 3-D holographic images that can recreate or represent the original 3-D scene from various visual perspectives (e.g., various viewing angles).

A hologram is often considered to be the ultimate solution to 3-D display, as it can record the complex wavefront emitted from a 3-D object scene. A complex hologram can reproduce desirable (e.g., excellent quality) 3-D images that can be free from the unwanted images that can be present in other types of holograms (e.g., amplitude). A desirable scenario can be displaying the complex hologram with a single complex device, employing illumination with a coherent light source (e.g., a light-emitting diode (LED) source). However, in reality, a conventional system for displaying a complex hologram can be expensive and difficult to construct.

The above-described description is merely intended to provide a contextual overview relating to digital holograms, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

One or more embodiments, such as one or more systems, methods, computer readable storage mediums, and techniques disclosed herein, relate to processing and generating holograms. Disclosed herein is a system comprising at least one memory that stores computer-executable components, and at least one processor that facilitates execution of the computer-executable components stored in the at least one memory. The computer-executable components comprising a holographic generator component that receives or generates a complex hologram that represents an object scene, wherein the complex hologram comprises a plurality of pixels. The computer-executable components also comprising a hologram processor component that converts a complex value of a pixel of the plurality of pixels to a phase value and performs an error diffusion process to facilitate diffusion of an error associated with the conversion of the complex value to the phase value to facilitate generation of a phase hologram that corresponds to the complex hologram.

Also disclosed herein is a method that comprises converting, by the system, a complex value of a member of a plurality of members of a complex hologram to a phase value. The method also comprises performing, by the system, an error diffusion process to facilitate diffusing an error associated with the converting of the complex value to the phase value to facilitate generating a phase hologram that corresponds to the complex hologram, wherein the complex hologram represents an object scene.

Further disclosed herein is a computer-readable storage device comprising computer-executable instructions that, in response to execution, cause a system comprising a processor to perform operations. The operations comprise modifying a complex value of a member of a plurality of members of a complex hologram to a phase-only value. The operations also comprise applying an error diffusion process to facilitate diffusing an error associated with the modifying of the complex value to the phase-only value to facilitate generating a phase-only hologram that corresponds to the complex hologram, wherein the complex hologram represents an object scene.

The disclosed subject matter also includes a system comprising means for converting a complex value of a pixel of a plurality of pixels of a complex hologram to a phase value. The system also comprises means for performing an error diffusion process to facilitate diffusing an error associated with the converting of the complex value to the phase value to facilitate generating a phase hologram that corresponds to the complex hologram, wherein the complex hologram represents an object scene.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
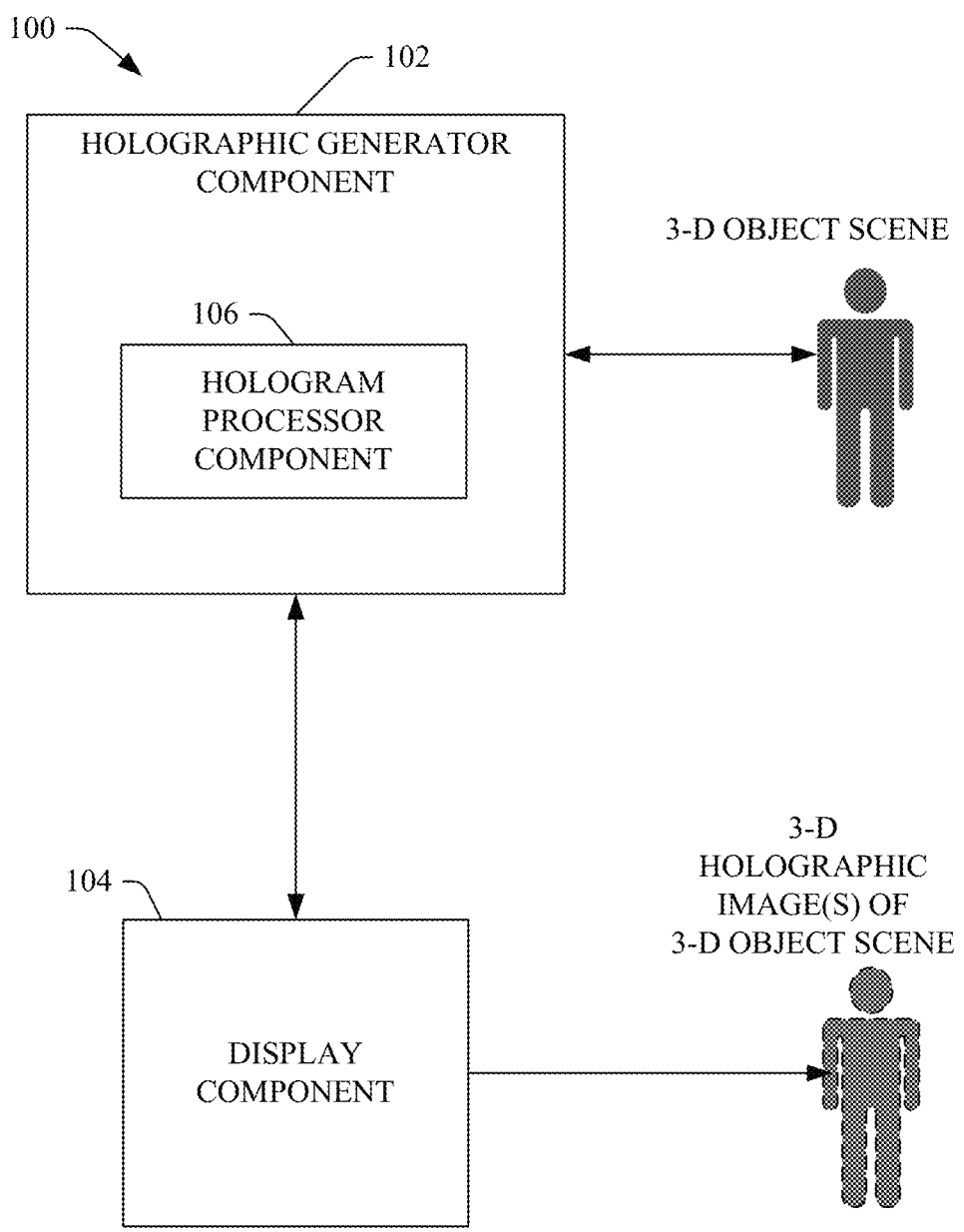
FIG. 1 depicts a block diagram of a system that can efficiently and quickly convert a complex 3-D hologram(s) of a real or synthetic 3-D object scene(s) to a phase hologram(s), and display 3-D holographic images, based at least in part on the phase hologram(s), on a display component, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Computer-generated holography (CGH) has undergone encouraging development in the past two decades. One of the major factors leading to the success in CGH can be attributed to the emergence of fast algorithms that can speed up the computation of the digital hologram by a significant amount. On top of that, the rapid advancement of computing and semiconductor technologies have enabled a medium size digital hologram to be generated numerically quickly using a relatively low cost commodity personal computer (PC) and hardware, such as field programmable gate array (FPGA). Despite this somewhat favorable progress in the area of CGH, the display of a hologram can be a difficult problem that can impose, to a certain extent, a bottleneck to the practical realization of the holographic technology.

One problem is that high resolution devices that are capable of displaying holograms, such as Liquid Crystal on Silicon (LCoS) display devices, typically are only capable of displaying either the magnitude component or the phase component of a complex hologram (e.g., a complex amplitude hologram that comprises a magnitude component (e.g., an amplitude magnitude component or portion) (having a magnitude value) and a phase component or portion (having a phase value)). A straightforward solution to this problem, is to employ two spatial light modulators (SLMs) to display the real and imaginary components, or the amplitude and phase information, of a complex hologram. Likewise, a complex hologram can be simulated with a double phase-only hologram, and displayed with a pair of phase-only SLMs. In some implementations, the pair of SLMs can be replaced by a single device, displaying a pair of holograms and subsequently merging the reconstructed wavefront through a grating. Although such an approach can be effective, the optical setups can be rather complicated. Further, when using such an approach, the area of the SLM allocated to each component of the hologram may be reduced to half of its original size.

Alternatively, a complex hologram can be converted into either an amplitude-only, or a phase-only hologram (POH) so that it can be displayed directly with a single display device. However, if an amplitude-only display is used to display the hologram, the reconstructed image can be contaminated with a de-focused twin image. While the real twin image can be diverted away from the reconstructed virtual image by converting an on-axis hologram into an off-axis hologram, the angular separation between the two images can be limited by the resolution of the display. Further, the optical efficiency of an amplitude hologram can be rather low as the illumination beam can be attenuated by the opacity of the fringe patterns.

On the other hand, a POH can be displayed with a phase-only display device and can result in higher optical efficiency as well as rejection of the twin image. On the downside, however, using certain conventional techniques that remove the magnitude component can lead to relatively heavy and undesirable (e.g., unacceptable) distortion on the reconstructed image. To attempt to alleviate this problem, a Gerberg-Saxton algorithm, or iterative Fresnel transform often can be adopted to compute the phase hologram in an iterative manner, so that the reconstructed image can match with a target planar image. However, the phase hologram generated with such approach can be computationally intensive. The fastest conventional method of generating a POH developed to date probably can be the "One-Step Phase Retrieval (OSPR) process." In this OSPR method, a random phase can be first added to the object points prior to the generation of the digital hologram. The phase component of the hologram, which may be quantized with thresholding or error diffusion, can be displayed with a phase-only device. The reconstructed images of the holograms generated with the OSPR process generally can be noisy and consequently multiple sub-frames, each representing the same object scene added with different random phase patterns, typically have to be presented rapidly to the observers to try to average out the speckle noise. However, these sub-frames can involve more computation to generate, and also typically have to be displayed at a relatively high frame rate to avoid the visual problem of flickering.

To that end, presented are techniques for fast (e.g., at video rate in real-time or at least near real-time) processing of information represented in digital holograms to facilitate converting a complex Fresnel hologram into a single phase hologram (e.g., a POH, phase-specific hologram, or pure phase hologram), and displaying 3-D holographic images representative of a 3-D object scene on a display device based at least in part on the phase hologram. In accordance with various implementations, the phase hologram can be a bidirectional error diffusion (BERD) hologram or a unidirectional error diffusion (UERD) hologram. The BERD hologram and UERD hologram, respectively, for example, can be capable of representing the 3-D object scene and preserving favorable visual quality of the reconstructed holographic image of the 3-D object scene.

A holographic generator component (HGC) can receive or generate a complex hologram (e.g., complex full-parallax 3-D Fresnel hologram) that can represent a 3-D object scene from a number of different visual perspectives (e.g., from a number of different viewing angles). In some implementations, the HGC can generate a complex hologram of the 3-D object scene at video rate (e.g., a standard video rate or a video rate of approximately 40 frames per second or faster) in real or near real time.

The HGC can comprise a hologram processor component that can facilitate generating complex holograms, converting complex holograms to phase holograms, and displaying of phase holograms on a display device at a desired rate (e.g., at video rate, in real-time or at least near real-time). The hologram processor component can facilitate directly applying a BERD process to the complex hologram to facilitate converting the complex hologram into a phase hologram. For example, the hologram processor component can scan the pixels in the complex hologram sequentially in a row by row manner. For instance, the hologram processor component can scan the odd and even rows from opposite directions, which can constitute part of the BERD process. The hologram processor component can modify or force the magnitude of each visited (e.g., scanned) pixel to a desired constant magnitude value, while preserving the exact or actual phase value of each pixel. The hologram processor component can facilitate diffusing the resulting error to the neighboring pixels of the complex hologram that have not been visited before by the hologram processor component to that point. Alternatively, in some implementations, the hologram processor component can facilitate directly applying a UERD process to the complex hologram to facilitate converting the complex hologram into a phase hologram, as more fully disclosed herein.

A display device, such as an SLM or an LCoS display device can be used to facilitate displaying 3-D holographic images (e.g., full-parallax 3-D holographic images) that can be reconstructed using the phase hologram. In some implementations, the display device can be a phase-only or phase-specific display device (e.g., phase-only SLM display device). With regard to a BERD hologram, the reconstructed holographic images from the BERD hologram can exhibit a desirably high fidelity as compared with reconstructed holographic images obtained using the original complex hologram. For instance, the reconstructed holographic images can be free or at least substantially free from zero-order diffraction, twin images, or other problems associated with conventional methods or techniques. Further, in contrast to conventional methods or techniques, no further processing (e.g., no further hologram generation processing, such as, for example, quantization or other type of hologram generation processing) is necessary after the hologram is generated, as the recorded 3-D holographic image can be reconstructed by illuminating the phase hologram (e.g., POH, phase-specific hologram, or pure phase hologram) via an SLM device using a coherent beam of light. In other implementations, the phase hologram also can be displayed using a static media (e.g., a single static media), such as a photographic film or a printout, comprising information relating to the phase hologram.

Turning to FIG. 1, illustrated is a block diagram of an example system 100 that can efficiently and quickly (e.g., in real time or at least near real time) convert a complex 3-D hologram(s) (e.g., a complex full-parallax 3-D Fresnel hologram(s)) of a real or synthetic 3-D object scene(s) to a phase hologram(s), and display 3-D holographic images, based at least in part on the phase hologram(s), on a display component (e.g., a phase-only or phase-specific display component), in accordance with various aspects and embodiments of the disclosed subject matter. In an aspect, the system 100 can include a holographic generator component (HGC) 102 that can desirably generate a complex hologram (e.g., a complex hologram of a sequence of 3-D holographic images) that can represent a 3-D object scene (e.g., real or computer-synthesized 3-D object scene) from multiple different viewing perspectives that can correspond to multiple different viewing perspectives of the original 3-D object scene. A complex hologram (e.g., a complex amplitude hologram) is a hologram that can comprise a magnitude component or portion (e.g., an amplitude magnitude component or portion), which can have a magnitude value, and a phase component or portion, which can have a phase value. As more fully disclosed herein, the HGC 102 can convert the complex hologram to a phase hologram (e.g., a phase-only hologram (POH), phase-specific hologram, or pure phase hologram), wherein the phase hologram can be used to generate, reconstruct, or reproduce 3-D holographic images for display to one or more viewers, and wherein the 3-D holographic images can represent or recreate the original 3-D object scene from multiple visual perspectives.

In some embodiments, the HGC 102 and/or other components (e.g., display component 104) of the system 100 can be part of a multiple-view aerial holographic projection system (MVAHPS) that can generate and display a 3-D holographic image(s) of a 3-D real or synthetic, static or animated, object scene viewable from multiple perspectives (e.g., multiple angles in relation to the 3-D object scene), wherein the 3-D holographic image(s) can be viewed, for example, as a 3-D image(s) floating in mid-air in a desired display area (e.g., 3-D chamber) associated with the display component 104. The HGC 102 and display component 104 (e.g., a SLM or LCoS display device, which can be a phase-only or phase-specific display device) can facilitate generating and displaying holograms (e.g., phase holograms) at video rate in real time or near real time (e.g., facilitate generating a complex hologram, converting the complex hologram to a phase hologram, and displaying, for example, 2048×2048 pixel holographic images, each of which can represent 4 million object points, at approximately 40 frames per second or faster in real time or near real time).

The HGC 102 can receive (e.g., obtain) a real 3-D object scene (e.g., captured 3-D object scene), or can generate or receive a synthetic 3-D object scene (e.g., computer generated 3-D object scene). In some implementations, the HGC 102 can generate or receive a computer generated 3-D object scene that can be realized (e.g., generated) using numerical means without the presence of a physical or real-world 3-D object scene. Based at least in part on the real or synthetic 3-D object scene, the HGC 102 can generate holograms, wherein the generated holograms (e.g., full-parallax 3-D Fresnel holographic images) can represent or recreate the original 3-D object scene from multiple visual perspectives (e.g., multiple viewing angles).

In some implementations, the HGC 102 can generate model data that can represent the 3-D object scene from a desired number of viewing perspectives, based at least in part on received or generated information regarding the original 3-D object scene from multiple visual perspectives.

The HGC 102 also can convert the model data to generate digital holographic data for the 3-D hologram that can be used to facilitate generating and displaying 3-D holographic images that can represent or recreate the original 3-D object scene from multiple visual perspectives.

The HGC 102 can employ any of a variety of techniques or processes to facilitate generating complex 3-D holograms of a 3-D object scene at video rate (e.g., approximately 30 frames per second) or faster or in real or near real time. For instance, in some implementations, the HGC 102 can generate holograms, such as digital mask programmable holograms (DMPHs) that can be complex holograms that can be different from the classical digital Fresnel holograms. A DMPH can mimic a high-resolution hologram, but also can be displayed using display devices that can have considerably lower resolution. The HGC 102 can produce a DMPH by the superposition of two images. For instance, the HGC 102 can produce a DMPH that can comprise a static, high-resolution grating (e.g., a static high-resolution image) and a lower-resolution mask (e.g., a lower-resolution image), wherein the lower-resolution mask can be overlaid onto or superpositioned with the high-resolution grating. The HGC 102 can generate a DMPH such that the reconstructed holographic image of the DMPH can be programmed to approximate a target image (e.g., planar target image), including both intensity and depth information, by configuring the pattern of the mask. Employing such fast hologram techniques relating to DMPHs, the HGC 102 can facilitate generating complex holograms at video rate in real or near real time (e.g., facilitate generating and displaying, for example, a 2048×2048 pixel hologram, which can represent 4 million object points, at 40 frames per second or faster in real or near real time).

In certain implementations, the HGC 102 can facilitate quickly generating (e.g., at video rate of faster) complex holograms in part, for example, by downsampling information representing an object scene by a defined factor, generating an intermediate object wavefront recording plane (WRP) or an interpolative wavefront recording plane (IWRP) for a 3-D image of a 3-D object scene and/or using a look-up table(s) to store wavefront patterns of square regions of the 3-D image, and further processing (e.g., expanding, interpolating, etc.) the WRP or IWRP to facilitate generating holographic images that can represent the original object scene. Employing such fast hologram generation techniques or processes, the HGC 102 can facilitate generating a complex hologram (e.g., a 2048×2048 pixel complex hologram, which can represent 4 million object points) at 40 frames per second or better. The HGC 102 can efficiently generate complex full-parallax 3-D Fresnel holograms that can represent less than 4 million object points, 4 million object points, or more than 4 million object points, at less than 40 frames per second, 40 frames per second, or more than 40 frames per second. The fast hologram generation techniques or processes, as disclosed herein, are merely a few of a number of fast hologram generation techniques or processes that can be employed to facilitate generating a complex hologram (e.g., a 2048×2048 pixel hologram, which can represent 4 million object points) at 40 frames per second or faster in real or near real time.

To facilitate efficiently, generating, converting, and displaying phase holograms of desirable quality, the hologram processor component 106 can quickly (e.g., at video rate or a faster rate, in real-time or at least near real-time) process information represented in digital holograms to facilitate converting a complex hologram (e.g., a complex full-parallax 3-D digital Fresnel hologram) to a single phase hologram (e.g., a POH, phase-specific hologram, or pure phase hologram), and displaying 3-D holographic images representative of a 3-D object scene on a display component 104 based at least in part on the phase hologram. In accordance with various implementations, the hologram processor component 106 can convert a complex hologram to a phase hologram that can be, for example, a bidirectional error diffusion (BERD) hologram or a unidirectional error diffusion (UERD) hologram, as more fully disclosed herein. The BERD hologram and UERD hologram, respectively, for example, can be capable of representing the 3-D object scene and preserving favorable visual quality of the reconstructed holographic image of the 3-D object scene as compared to the visual quality of a reconstructed holographic image resulting from an original complex hologram.

With regard to the UERD process, in some implementations, the hologram processor component 106 can facilitate directly performing a UERD process on the complex hologram to facilitate converting the complex hologram into a phase hologram (e.g., POH, phase-specific hologram, or pure phase hologram). By directly performing the UERD process, it is meant that, with regard to a complex hologram, the hologram processor component 106 can perform the UERD process on the complex hologram to produce a phase hologram without having to perform additional hologram generation processing, such as, for example, quantization or other type of hologram generation processing. For all or desired members (e.g., pixels) of a complex hologram, the hologram processor component 106 can scan, analyze, or examine each member of the complex hologram. For instance, the hologram processor component 106 can scan, analyze, or examine the members of the complex hologram in a row by row manner (e.g., scanning pixels in a first row, scanning pixels in a second row, and so on), for example, in a left to right manner (e.g., by scanning a pixel in a row, scanning a next pixel that is to the right of the pixel in the row, and so on).

For each member that is being visited or scanned, the hologram processor component 106 can convert the complex value (e.g., magnitude and phase values) of the member to a phase value (e.g., a phase-only or phase-specific value). For instance, the hologram processor component 106 can set or modify (or remove) the magnitude value of the member to a defined constant magnitude value, while maintaining the phase value of the member at its original value (e.g., keeping the phase value exactly as it is in the complex hologram), to facilitate converting the complex value of the member to a phase value.

Converting a member of a complex hologram from a complex value to a phase value can result in an error, if no other processing is performed. To facilitate compensating or reducing the effect of this error, the hologram processor component 106 can apply or perform a desired diffusion process or technique to facilitate diffusing the error to certain (e.g., not previously visited) neighbor members in proximity to (e.g., next to) the member in the hologram. For example, when scanning members of a complex hologram from left to right in a row and scanning the rows from top row to bottom row in the hologram, with regard to a member (e.g., located at $x_j$, $y_j$ in the hologram) that had its complex value converted to a phase value, the hologram processor component 106 can apply or perform the desired diffusion process or technique to or on a first neighbor member to the right of the member in the row (e.g., located at $x_j$, $y_j+1$ in the hologram), a second neighbor member in the next row down and one space (e.g., pixel space) back (e.g., to the left) in that row (e.g., located at $x_j+1$, $y_j-1$ in the hologram), a third neighbor member in the next row down directly below the member (e.g., located at $x_j+1$, $y_j$ in the hologram), and a fourth member in the next row down and one space to the right of the member (e.g., located at $x_j+1$, $y_j+1$ in the hologram), to facilitate diffusing the error to those certain neighbor members in proximity to the member in the hologram, wherein those certain neighbor members have been visited or scanned yet by the hologram processor component 106. As part of the diffusion process or technique (e.g., UERD process or technique), the hologram processor component 106 can update the respective complex values (e.g., complex quantities) of the respective certain neighbor members by respective defined error-based values to generate respective new or updated complex values for those respective certain neighbor members based at least in part on the error associated with the member due to the conversion and respective defined constant coefficients applicable to the respective certain neighbor members, as more fully disclosed herein. The hologram processor component 106 can continue to perform this UERD process for all or a desired portion of the members of the complex hologram to convert the respective complex values of the members to respective phase values, and to diffuse error associated with a given member after its conversion to certain (e.g., not previously visited) neighbor members in proximity to that member to generate respective updated complex values for those certain neighbor members. By performing this UERD process, the hologram processor component 106 can convert the complex hologram to a phase hologram.

The HGC 102 and/or display component 104 can facilitate generating a reconstructed holographic image(s) based at least in part on the phase hologram resulting from the UERD process. For instance, the HGC 102 and/or display component 104 can facilitate applying a coherent optical beam to the phase hologram to facilitate generating a reconstructed holographic image(s) that can represent the 3-D object scene associated with the original complex hologram. As illustrated in the disclosed subject matter, the reconstructed holographic image(s), generated based at least in part on the phase hologram derived from the UERD process, can have a similar visual quality as that of a reconstructed holographic image(s) that can be obtained using the original complex hologram.

It is noted though that, while the UERD process can be quite effective in producing reconstructed holographic images of favorable quality, and represents an improvement over conventional systems, methods, and techniques for holographic generation and display, there can be some noise contamination on the reconstructed holographic image(s). In some implementations, the disclosed subject matter can employ the BERD process to further improve the generation and display of holograms over that generated via the UERD process, and to improve even further the generation and display of holograms over that of conventional systems, methods, and techniques for holographic generation and display.

With regard to the BERD process, the hologram processor component 106 can facilitate directly applying a BERD process to the complex hologram to facilitate converting the complex hologram into a phase hologram. By directly performing the BERD process, it can be meant that, with regard to a complex hologram, the hologram processor component can perform the BERD process on the complex hologram to produce a phase hologram without having to perform additional hologram generation processing, such as, for example, quantization or other type of hologram generation processing. Some differences between the BERD process and the UERD process can be, for example, the difference between how the hologram processor component 106 performs the scanning of the members of the complex hologram as part of the BERD process as compared to during the UERD process, and the difference between the updating of complex values of neighbor members during the BERD process as compared to during the UERD process. For instance, as part of the BERD process, the hologram processor component 106 can scan, analyze, or examine the pixels in the complex hologram sequentially in a row by row manner, wherein the hologram processor component 106 can scan, analyze, or examine the odd and even rows from opposite directions (e.g., can scan the members of the odd rows of the complex hologram from left to right and scan the members of the even rows of the complex hologram from right to left, or vice versa).

As part of the BERD process (as with the UERD process), for each member that is being visited or scanned, the hologram processor component 106 can convert the complex value (e.g., magnitude and phase values) of the member to a phase value (e.g., a phase-only or phase-specific value). For instance, the hologram processor component 106 can set or modify (or remove) the magnitude value of the member to a defined constant magnitude value (e.g., a value of unity or another desired constant magnitude value), while maintaining the phase value of the member at its original value (e.g., keeping the phase value exactly as it is in the complex hologram), to facilitate converting the complex value of the member to a phase value.

Converting a member of a complex hologram from a complex value to a phase value can result in an error, if no further processing is performed. To facilitate compensating or reducing the effect of this error, the hologram processor component 106 can apply or perform a desired diffusion process or technique (e.g., BERD process or technique) to facilitate diffusing the error to certain (e.g., not previously visited) neighbor members in proximity to (e.g., next to) the member in the hologram. For instance, when scanning members of a complex hologram from left to right in an odd row of the complex hologram, and scanning the rows of the complex hologram from the top row to bottom row in the hologram, with regard to a member (e.g., located at $x_j$, $y_j$ in an odd row of the hologram) that had its complex value converted to a phase value, the hologram processor component 106 can apply or perform the desired diffusion process or technique to or on a first neighbor member to the right of the member in the row (e.g., located at $x_j$, $y_j+1$ in the hologram), a second neighbor member in the next row down and one space (e.g., pixel space) back (e.g., to the left) in that row (e.g., located at $x_j+1$, $y_j-1$ in the hologram), a third neighbor member in the next row down directly below the member (e.g., located at $x_j+1$, $y_j$ in the hologram), and a fourth member in the next row down and one space to the right of the member (e.g., located at $x_j+1$, $y_j+1$ in the hologram), to facilitate diffusing the error to those certain neighbor members in proximity to that member in the odd row in the hologram, wherein those certain neighbor members have been visited or scanned yet by the hologram processor component 106.

When scanning members of a complex hologram from right to left in an even row of the complex hologram, and scanning the rows of the complex hologram from the top row to bottom row in the hologram, with regard to a member (e.g., located at $x_j$, $y_j$ in an even row of the hologram) that had its complex value converted to a phase value, the hologram processor component 106 can apply or perform the desired diffusion process or technique to or on a first neighbor member to the left of the member in the row (e.g., located at $x_j$, $y_j-1$ in the hologram), a second neighbor member in the next row down and one space (e.g., pixel space) to the right in that row (e.g., located at $x_j+1$, $y_j+1$ in the hologram), a third neighbor member in the next row down directly below the member (e.g., located at $x_j+1$, $y_j$ in the hologram), and a fourth member in the next row down and one space to the left of the member (e.g., located at $x_j+1$, $y_j-1$ in the hologram), to facilitate diffusing the error to those certain neighbor members in proximity to that member in the even row of the hologram, wherein those certain neighbor members have been visited or scanned yet by the hologram processor component 106.

As part of the BERD diffusion process or technique, with regard to the certain neighbor members associated with a member visited (e.g., scanned and converted to a phase value) in an odd row, the hologram processor component 106 can update the respective complex values (e.g., complex quantities) of the respective certain neighbor members of the member by respective defined error-based values to generate respective new or updated complex values for those respective certain neighbor members based at least in part on the error associated with the member due to the conversion and respective defined constant coefficients applicable to the respective certain neighbor members, as more fully disclosed herein. With regard to the certain neighbor members of a member visited (e.g., scanned and converted to a phase value) in an even row, the hologram processor component 106 also can update the respective complex values (e.g., complex quantities) of the respective certain neighbor members of the member by respective defined error-based values to generate respective new or updated complex values for those respective certain neighbor members based at least in part on the error associated with the member due to the conversion and respective defined constant coefficients applicable to the respective certain neighbor members, as more fully disclosed herein.

The hologram processor component 106 can continue to perform this BERD process for all or a desired portion of the members of the complex hologram to convert the respective complex values of the members to respective phase values, and to diffuse an error associated with a given member after its conversion to certain (e.g., not previously visited) neighbor members in proximity to that member to generate respective updated complex values for those certain neighbor members. By performing this BERD process, the hologram processor component 106 can convert the complex hologram to a phase hologram.

The HGC 102 and/or display component 104 can facilitate generating a reconstructed holographic image(s) based at least in part on the phase hologram resulting from the BERD process. For instance, the HGC 102 and/or display component 104 can facilitate applying a coherent optical beam to the phase hologram to facilitate generating a reconstructed holographic image(s) that can represent the 3-D object scene associated with the original complex hologram.

As illustrated in the disclosed subject matter, the reconstructed holographic image(s), generated based at least in part on the phase hologram derived from the BERD process, can have a favorable visual quality (e.g., a desirably high fidelity) that can be of substantially similar visual quality to the visual quality of a reconstructed holographic image(s) that can be obtained using the original complex hologram. For instance, the reconstructed holographic images can be free or at least substantially free from zero-order diffraction, twin images, or other problems associated with certain conventional methods or techniques for hologram generation and display. Further, in contrast to conventional methods or techniques, no further processing (e.g., no additional hologram generation processing, such as, for example, quantization or other type of hologram generation processing) is necessary after the hologram is generated, as the recorded 3-D holographic image can be reconstructed by illuminating the phase hologram (e.g., POH, phase-specific, or pure phase hologram) via a display device (e.g., phase-only SLM display device) with a coherent beam of light.

With further regard to the display component 104, the display component 104 can be electronically accessible. The HGC 102 can be associated with (e.g., communicatively connected to) the display component 104 and can provide (e.g., communicate) the 3-D hologram (e.g., the 3-D phase hologram) to the display component 104, for example, at video rate or a faster rate in real or near real time. In some implementations, the 3-D phase hologram can be on recorded media (e.g., 2-D media, such as film), and the HGC 102 can provide the 3-D phase hologram via the recorded media, as disclosed herein.

The display component 104 can facilitate generating, reconstructing, reproducing, or presenting 3-D holographic images (e.g., full-parallax 3-D Fresnel holographic images) that can represent or recreate the original 3-D object scene, based at least in part on the phase hologram, and can present (e.g., display) the 3-D holographic images for viewing by one or more viewers from various visual perspectives of the original 3-D object scene. In some implementations, the HGC 102 and the display component 104 can operate in conjunction with each other to facilitate generating, reconstructing, reproducing, or presenting the 3-D holographic images that can represent or recreate the original 3-D object scene, based at least in part on the phase hologram, for presentation, by the display component 104. The display component 104 can be or can comprise a display device(s), such as an SLM display device or an LCoS display device that can be used to facilitate displaying 3-D holographic images (e.g., full-parallax 3-D holographic images) that can be reconstructed using the phase hologram. In some implementations, the display component 104 can be or can comprise a phase-only or phase-specific display device(s) (e.g., phase-only SLM display device).

In some implementations, the display component 104 can include one or more display units (e.g., one or more electronically accessible display units, wherein each pixel of a display unit(s) can be electronically accessible), wherein each display unit can be a phase-only display device, such as a phase-only SLM display device or a phase-only LCoS display device. In other implementations, the display component 104 can comprise one or more of high-resolution LCDs, autostereoscopic display devices (e.g., multiple-section autostereoscopic displays (MSADs)), holographic 3-D television (TV) displays, high-resolution LCoS display devices, high-resolution SLM display devices, or other desired display devices suitable for displaying holographic images (e.g., 3-D Fresnel holographic images produced from phase holograms), to facilitate displaying (e.g., real time displaying) of holographic images.

Additionally and/or alternatively, if desired, a hologram can be produced (e.g., by the HGC 102 or another component) onto a desired material (e.g., onto film using photographic techniques) so that there can be a hard copy of the hologram that can be used to reproduce the 3-D holographic images at a desired time. In some implementations, the HGC 102 can generate the digital hologram (e.g., the 3-D phase hologram) using a single static media, such as a photographic film or a printout, comprising information relating to the digital hologram. The display component 104 can display holographic images that can be reconstructed based at least in part on the digital hologram of the static media.

It is to be appreciated and understood that the holographic output (e.g., 3-D hologram and/or corresponding 3-D holographic images) can be communicated over wired or wireless communication channels to the display component 104 or other display components (e.g., remote display components, such as a 3-D TV display) to facilitate generation (e.g., reconstruction, reproduction) and display of the 3-D holographic images of the 3-D object scene) so that the 3-D holographic images can be presented to desired observers.

The system 100 and/or other systems, methods, devices, processes, techniques, etc., of the disclosed subject matter can be employed in any of a number of different applications. Such applications can include, for example, a 3-D holographic video system, desktop ornaments, attractions in theme parks, educational applications or purposes, a holographic studio, scientific research, live stage or concerts, etc.

Figure 2:
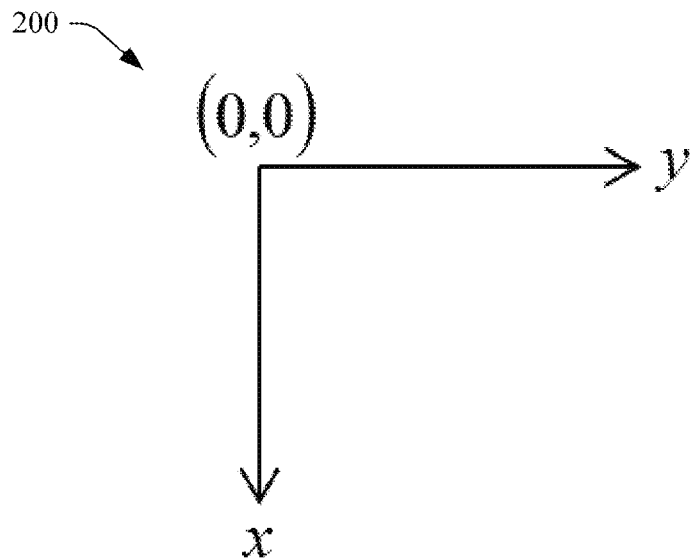
FIG. 2 depicts a diagram of an example co-ordinate system that can illustrate vertical and horizontal axes of the co-ordinate system in connection with a hologram comprising pixels.

Further aspects and embodiments of the disclosed subject matter are described herein with regard to FIG. 1 and the other figures disclosed herein. There can be a complex full-parallax 3-D Fresnel hologram that can be generated (e.g., by the HGC 102) from object waves emitted from each point on a 3-D object scene (e.g., a real or synthesized 3-D object scene). Each pixel in the complex hologram can be denoted by $P_{x,y}$ and can have a value $H(x,y)$, wherein x and y are the vertical and horizontal axes of the co-ordinate system 200, respectively, as shown in FIG. 2, for example, as given by Equation (1) as follows:

$$H(x,y)|_{\substack{0 \leq x < X \\ 0 \leq y < Y}} = \sum_{u=0}^{X-1} \sum_{v=0}^{Y-1} \frac{I(u,v)\exp(i2\pi r_{u,v;x,y}/\lambda)}{r_{u,v;x,y}}, \quad (1)$$

wherein $I(u,v)$ and $r_{u,v;x,y}=[(x-u)^2 \delta+(y-v)^2 \delta+w_{u,v}^2]^{0.5}$ are the intensity of the point located at $(u,v)$ in the 3D scene and its distance to the hologram, respectively. The perpendicular distance of a point at position $(u,v)$ to the hologram can be denoted by $w_{u,v}$, $\lambda$ can be the wavelength of the optical beam, and $\delta$ can be the pixel size of the hologram. X and Y can be the number of rows and columns of the hologram, respectively, and which can be assumed to be the same as (e.g., can correspond to) the 3-D object scene. The complex hologram can be converted into a POH, $H_p(x,y)$, by setting the magnitude of each pixel to be transparent with a value of unity, which can remove the magnitude information, for example, as given by Equation (2):

$$|H_p(x,y)|=1, \text{ and } \arg(H_p(x,y))=\arg(H(x,y)). \quad (2)$$

However, as disclosed herein, the quality of the reconstructed image of a POH generated merely by using Equation (2) can be extremely poor (e.g., can have heavy distortion). It is apparent that the heavy distortion on the reconstructed image can be caused by the large amount of error in each hologram pixel that can result after removing the magnitude information.

To facilitate overcoming this problem (e.g., the problem of heavy distortion), the hologram processor component 106 can employ one or more error diffusion processes or techniques that can facilitate compensating the error of each hologram pixel. An error diffusion process can be outlined as follows. The hologram processor component 106 can scan each pixel in the complex hologram. For example, the hologram processor component 106 can scan each pixel in the complex hologram sequentially in a row by row, left to right manner (or, alternatively, a right to left manner). For example, with pixel $P_{x_j;y_j}$ being the pixel being processed by the hologram processor component 106, the next pixel to be scanned and processed can be $P_{x_j;y_j+1}$, followed by $P_{x_j;y_j+2}$, and so on until this row $x_j$ of pixels has been scanned and processed. The hologram processor component 106 can proceed to scan and process the pixels of the next row $x_{j+1}$ in a left to right manner.

With regard to each pixel that is scanned, the hologram processor component 106 can convert the value of the pixel under evaluation to a phase quantity (e.g., a phase-only or phase-specific quantity) $H_p(x,y)$, for example, in accordance with Equation (2). Given that $P_{x_j;y_j}$ is the current pixel that is being processed by the hologram processor component 106, setting the magnitude to unity can result in an error associated with that current pixel, wherein the error can be given, for example, by Equation (3):

$$E(x_j, y_j) = H(x_j, y_j) - H_p(x_j, y_j). \tag{3}$$

The hologram processor component 106 can facilitate diffusing the error $E(x_j, y_j)$ to the neighborhood pixels (e.g., pixels that neighbor the current pixel) that have not been visited previously by the hologram processor component 106 while scanning the complex hologram. To facilitate diffusing the error to the neighborhood pixels in proximity to the current pixel, the hologram processor component 106 can facilitate updating the neighborhood members in proximity to the current pixel, in accordance with (e.g., by applying or performing calculations according to) the following Equations (4), (5), (6), and (7):

$$H(x_j, y_j+1) \leftarrow H(x_j, y_j+1) + w_1 E(x_j, y_j), \tag{4}$$

$$H(x_j+1, y_j-1) \leftarrow H(x_j+1, y_j-1) + w_2 E(x_j, y_j), \tag{5}$$

$$H(x_j+1, y_j) \leftarrow H(x_j+1, y_j) + w_3 E(x_j, y_j), \tag{6}$$

$$H(x_j+1, y_j+1) \leftarrow H(x_j+1, y_j+1) + w_4 E(x_j, y_j), \tag{7}$$

wherein the operator "←" can denote updating (e.g., by the hologram processor component 106) the variable on the left hand side of the operator in the expression (e.g., equation) with the variable on the right hand side of the operator in the expression. The hologram processor component 106 can set the values of the constant coefficients $w_1$, $w_2$, and $w_3$, for example, to respective defined values, wherein $w_1 = 7/16$, $w_2 = 3/16$, $w_3 = 5/16$, and $w_4 = 1/16$.

Figure 3:
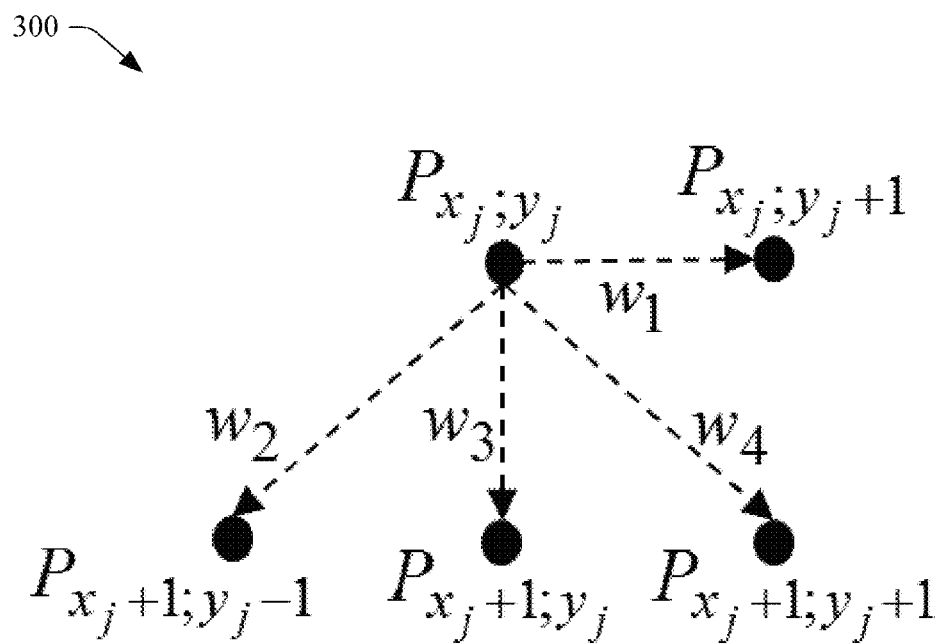
FIG. 3 illustrates a diagram of an example complex hologram portion that can depict the spatial relation between pixel and its neighbor pixels for compensation of the error via diffusion, in accordance with various aspects and embodiments of the disclosed subject matter.

In accordance with, for example, Equations (4) through (7), FIG. 3 illustrates a diagram of an example complex hologram portion 300 that can depict the spatial relation between pixel $P_{x_j;y_j}$ and its neighbor pixels (e.g., neighborhood pixels) for compensation of the error via diffusion, in accordance with various aspects and embodiments of the disclosed subject matter. The complex hologram portion 300 of FIG. 3 can facilitate illustrating how the scanned pixel $P_{x_j;y_j}$ can be processed to facilitate diffusing errors to its four unvisited neighborhood pixels $P_{x_j;y_j+1}$, $P_{x_j+1;y_j-1}$, $P_{x_j+1;y_j}$, and $P_{x_j+1;y_j+1}$. Equivalently, Equations (4) through (7) can be rearranged into a compact recursive expression that can be given by Equation (8) as follows:

$$H(x_j, y_h) \leftarrow H(x_j, y_j) + w_1 E(x_j, y_j-1) + w_4 E(x_j-1, y_j-1) + w_3 E(x_j-1, y_j) + w_2 E(x_j-1, y_j+1). \tag{8}$$

Figure 4:
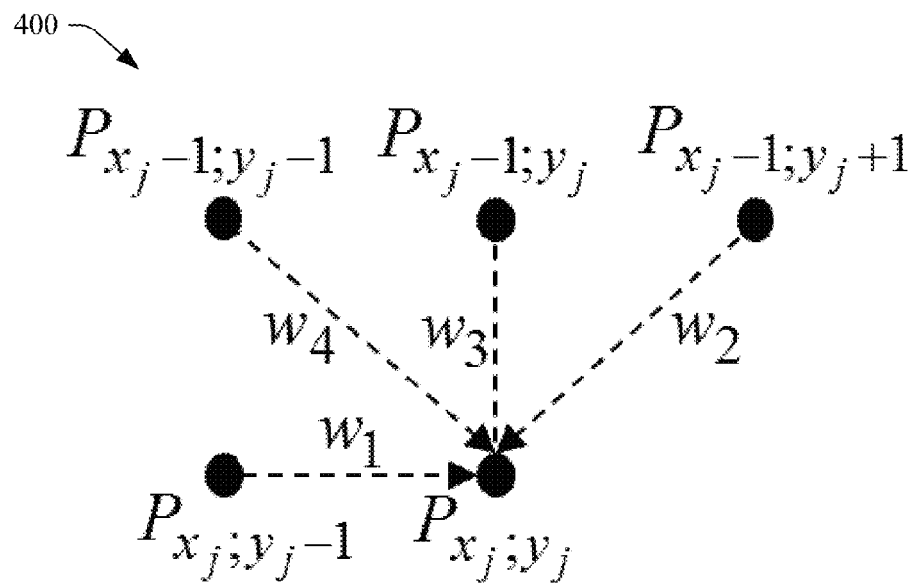
FIG. 4 presents an example diagram of an example complex hologram portion that can illustrate that the updated value of each pixel can be visualized as the weighted sum of its four neighboring pixels.

In accordance with Equation (8), FIG. 4 presents an example diagram of an example complex hologram portion 400 that can illustrate that the updated value of each pixel can be visualized as the weighted sum of its four neighboring pixels. For example, the hologram processor component 106 can visit (e.g., scan) and process (e.g., convert to a phase-only value) $P_{x_j-1;y_j-1}$, and can update $P_{x_j;y_j}$ (e.g., an unvisited neighbor pixel) based at least in part on the coefficient $w_4$; can visit (e.g., scan) and process $P_{x_j-1;y_j}$, and can update $P_{x_j;y_j}$ (e.g., an unvisited neighbor pixel) based at least in part on the coefficient $w_3$; can visit (e.g., scan) and process $P_{x_j-1;y_j+1}$, and can update $P_{x_j;y_j}$ (e.g., an unvisited neighbor pixel) based at least in part on the coefficient $w_2$; and can visit (e.g., scan) and process $P_{x_j;y_j-1}$, and can update $P_{x_j;y_j}$ based at least in part on the coefficient $w_1$. The resulting updated value of $P_{x_j;y_j}$ can be the weighted sum of the updates to $P_{x_j;y_j}$ resulting from the processing of its four neighboring pixels (e.g., $P_{x_j-1;y_j-1}$, $P_{x_j-1;y_j}$, $P_{x_j-1;y_j+1}$, and $P_{x_j;y_j-1}$) and the diffusing of the respective errors of those four neighboring pixels to $P_{x_j;y_j}$. After all the hologram pixels have been visited and processed (e.g., converted to phase-only values and errors diffused) by the hologram processor component 106, the resulting hologram generated by the hologram processor component 106 can be a phase hologram (e.g., a POH, phase-specific hologram, or pure phase hologram), which can be referred to as a UERD hologram or UERD phase hologram. As illustrated in the disclosed subject matter that describes certain experiment results, the reconstructed image of the phase hologram $H_p(x,y)$ generated by the hologram processor component 106 using this disclosed UERD process can be substantially similar to the reconstructed image that can be obtained using the original complex hologram.

The employing of the UERD process by the hologram processor component 106 to convert a complex hologram to a phase hologram can result in generating a reconstructed image that can be produced more efficiently and with higher quality than conventional methods or techniques for generating phase-only holograms. It is noted though that, the UERD process of the disclosed subject matter, while quite effective (e.g., while being an improvement over conventional methods or techniques), may result in some noise contamination on the reconstructed image. One possible explanation for this can be that, in the error diffusion process, as given in Equation (8), each hologram pixel may be summed up with the errors diffused from neighboring pixels at fixed relative positions. This can constitute to a process which can be similar to a predictive coder in which the error generated, to a certain extent, can be correlated to the signal. As a result, the reconstructed image of the hologram, $H_p(x,y)$, can be superimposed with the noise signal corresponding to the correlated error.

To facilitate overcoming this problem (e.g., noise contamination on the reconstructed image), this disclosed subject matter also describes an enhanced process or technique, referred to as the BERD process, to facilitate reducing the correlation between the holographic signal and the error, which can thereby facilitate further reducing the amount of noise contamination on a reconstructed image). As an initial matter, it is noted that the error diffusion process (e.g., the UERD process) represented in Equations (4) through (7) can be independent of the direction of scanning the pixels along each row of the hologram image. As such, as part of the BERD process, the hologram processor component 106 can modify the scanning direction of each row of pixels so that the recursive process in Equation (8), which can lead to the correlated error, can be interrupted after each row of pixels is visited. The hologram processor component 106 can diffuse the errors associated with the pixels on the odd rows of the complex hologram to the respective neighboring pixels (e.g., neighboring pixels that have not been visited or scanned yet by the hologram processor component 106), for example, in accordance with Equations (4) through (7); and the hologram processor component 106 can facilitate compensating for the errors associated with the pixels on the even rows by applying or performing the error diffusion process in the opposite direction (e.g., from right to left), for example, in accordance with Equations (9), (10), (11), and (12) below to facilitate diffusing the errors associated with the pixels on the even rows of the complex hologram. Equations (9) through (12), for example, can be as follows:

$$H(x_j, y_j-1) \leftarrow H(x_j, y_j-1) + w_1 E(x_j, y_j), \quad (9)$$

$$H(x_j+1, y_j+1) \leftarrow H(x_j+1, y_j+1) + w_2 E(x_j, y_j), \quad (10)$$

$$H(x_j+1, y_j) \leftarrow H(x_j+1, y_j) + w_3 E(x_j, y_j), \quad (11)$$

$$H(x_j+1, y_j-1) \leftarrow H(x_j+1, y_j-1) + w_4 E(x_j, y_j). \quad (12)$$

For instance, with regard to the scanning and processing of pixels (e.g., converting complex values of pixels to phase-only values) of the complex hologram, in accordance with the BERD process, with pixel $P_{x_j, y_j}$ being the pixel that is being processed by the hologram processor component 106 and the row being $x_j$, which can be an odd row of the complex hologram, the next pixel to be scanned and processed by the hologram processor component 106 can be $P_{x_j, y_j+1}$, followed by $P_{x_j, y_j+2}$, and so on, until this row $x_j$ of pixels has been scanned and processed. For an even row of the complex hologram, with pixel $P_{x_j+1, y_j}$ being the pixel (e.g., that is located at the right end of the row) that is being processed by the hologram processor component 106 and the row being $x_{j+1}$, which can be an even row, the next pixel to be scanned and processed by the hologram processor component 106 in that even row can be $P_{x_j, y_j-1}$, followed by $P_{x_j, y_j-2}$, and so on, until this row $x_{j+1}$ of pixels has been scanned and processed.

Figure 5:
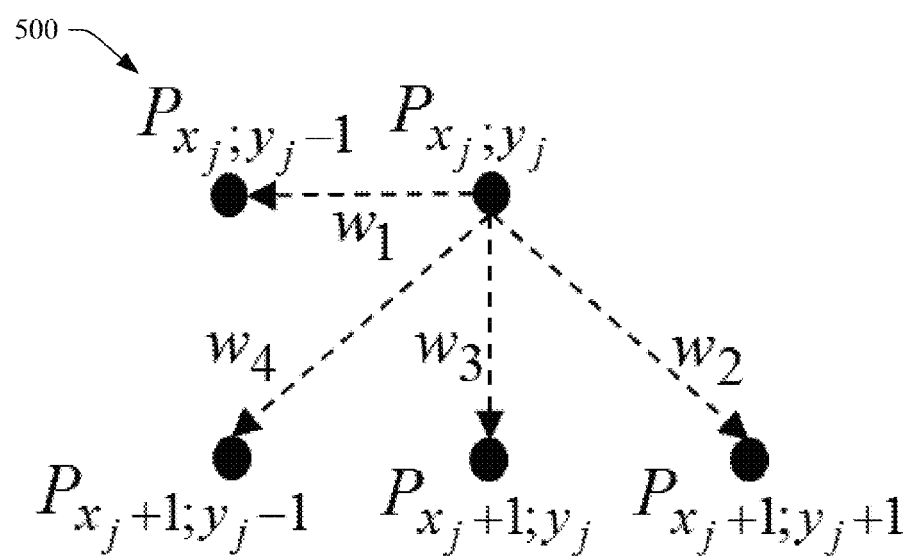
FIG. 5 presents a diagram of an example complex hologram portion that can depict the spatial relation between a pixel and its neighbor pixels for compensation of the error via diffusion using the bidirectional error diffusion (BERD) process, in accordance with various aspects and embodiments of the disclosed subject matter.

FIG. 5 presents a diagram of an example complex hologram portion 500 that can depict the spatial relation between pixel $P_{x_j, y_j}$ and its neighbor pixels for compensation of the error via diffusion using the BERD process, in accordance with various aspects and embodiments of the disclosed subject matter. In the example complex hologram portion 500, the row $x_j$ can be an even row of the complex hologram. In accordance with the BERD process, the hologram processor component 106 can proceed to scan and process the pixels of the row $x_j$ (e.g., an even row) in a right to left manner. For example, in accordance with the BERD process, the hologram processor component 106 can visit (e.g., scan) and process (e.g., convert to a phase-only value) $P_{x_j, y_j}$. The hologram processor component 106 also can update the complex value of $P_{x_j, y_j-1}$ (e.g., an unvisited neighbor pixel) to generate an updated complex value for that neighbor pixel to facilitate diffusing the error $E(x_j, y_j)$ associated with the pixel $P_{x_j, y_j}$, based at least in part on the error associated with processing the pixel and the applicable coefficient $w_1$, for example, in accordance with (e.g., by performing calculations or modifying values based at least in part on) Equation (9); can update the complex value of $P_{x_j+1, y_j+1}$ (e.g., an unvisited neighbor pixel) to generate an updated complex value for that neighbor pixel to facilitate diffusing the error $E(x_j, y_j)$ associated with the pixel $P_{x_j, y_j}$, based at least in part on the error associated with processing the pixel and the applicable coefficient $w_2$, for example, in accordance with Equation (10); can update the complex value of $P_{x_j+1, y_j}$ (e.g., an unvisited neighbor pixel) to generate an updated complex value for that neighbor pixel to facilitate diffusing the error $E(x_j, y_j)$ associated with the pixel $P_{x_j, y_j}$, based at least in part on the error associated with processing the pixel and the applicable coefficient $w_3$, for example, in accordance with Equation (11); and can update the complex value of $P_{x_j+1, y_j-1}$ (e.g., an unvisited neighbor pixel) to generate an updated complex value for that neighbor pixel to facilitate diffusing the error $E(x_j, y_j)$ associated with the pixel $P_{x_j, y_j}$, based at least in part on the error associated with processing the pixel and the applicable coefficient $w_4$, for example, in accordance with Equation (12).

In accordance with the disclosed BERD process, the hologram processor component 106 can scan and process the pixels in the complex hologram, and diffuse the respective error associated with the respective pixels, to generate the resulting phase hologram, based at least in part on the processing of the odd rows of the complex hologram, in accordance with Equations (4) through (7), and the processing of the even rows of the complex hologram, in accordance with Equations (9) through (12). The resulting phase hologram can be referred to as a BERD hologram or BERD phase hologram.

It is to be appreciated and understood that, while the disclosed subject matter describes that the hologram processor component 106 can scan and process pixels in the odd rows of the complex hologram, in accordance with Equations (4) through (7), and scan and process pixels in the even rows of the complex hologram, in accordance with Equations (9) through (12), the disclosed subject matter is not so limited. In accordance with various other implementations, the hologram processor component 106 alternatively can scan and process pixels in the even rows of the complex hologram, in accordance with Equations (4) through (7), and scan and process pixels in the odd rows of the complex hologram, in accordance with Equations (9) through (12) (e.g., an alternate BERD process); or can perform another technique or process that can scan and process pixels of the complex hologram to convert complex values of pixels of the complex hologram to phase values, can facilitate diffusing error resulting from converting the complex values of pixels to phase values to their respective neighbor pixels in the complex hologram, and can facilitate interrupting, reducing, minimizing, or counteracting correlated error that may develop during the scanning and processing of pixels in a row of the complex hologram, in accordance with the disclosed subject matter.

With regard to the UERD process and BERD process described above, the respective UERD and BERD processes assume that all of the pixels in the phase-only display device are normal (e.g., each pixel will exhibit a phase shift that is proportional to the value applied to it). The hologram processor component 106 also can include a means to facilitate decreasing the sensitivity of the phase hologram towards dead pixels (e.g., pixels that are opaque, or transparent with no phase shift, or a constant phase shift that is independent to the value applied to the pixel). Such dead pixels commonly can be found in many display devices due to the imperfection in manufacturing, and their positions and defective values can be evaluated beforehand. Dead pixels in a phase-only display device can be classified into 3 main types. For a dead pixel that is opaque, the hologram processor component 106 can set or modify the values (e.g., complex and imaginary parts) of such dead pixel to zero. For a dead pixel that is transparent with no phase shift, the hologram processor component 106 can set or modify the real part and imaginary part of the dead pixel's value to unity (e.g., one) and zero, respectively. For a dead pixel with a constant phase shift $\phi$, the hologram processor component 106 can set or modify the values of the dead pixel's real part and imaginary part to $\cos(\phi)$ and $\sin(\phi)$, respectively.

The error that can result from a pixel value, regardless of whether it is a normal pixel or a dead pixel, can be calculated, for example, in accordance with Eq. (3). For a particular pixel of a complex hologram that is being scanned, the hologram processor component 106 can diffuse such error to the pixels (e.g., neighbor pixels) that are normal in its neighborhood, via the UERD process or BERD process, as described herein.

In addition, the hologram processor component 106 can increase the weighting factor by a factor C that can be greater than 1. In some implementations, by assuming or deeming that $$\sum_{k=1}^{4} w_k = 1,$$

the hologram processor component 106 (or another component) can derive the factor C from the reciprocal of the sum of weighting factors associated with the normal pixel(s).

Figure 6:
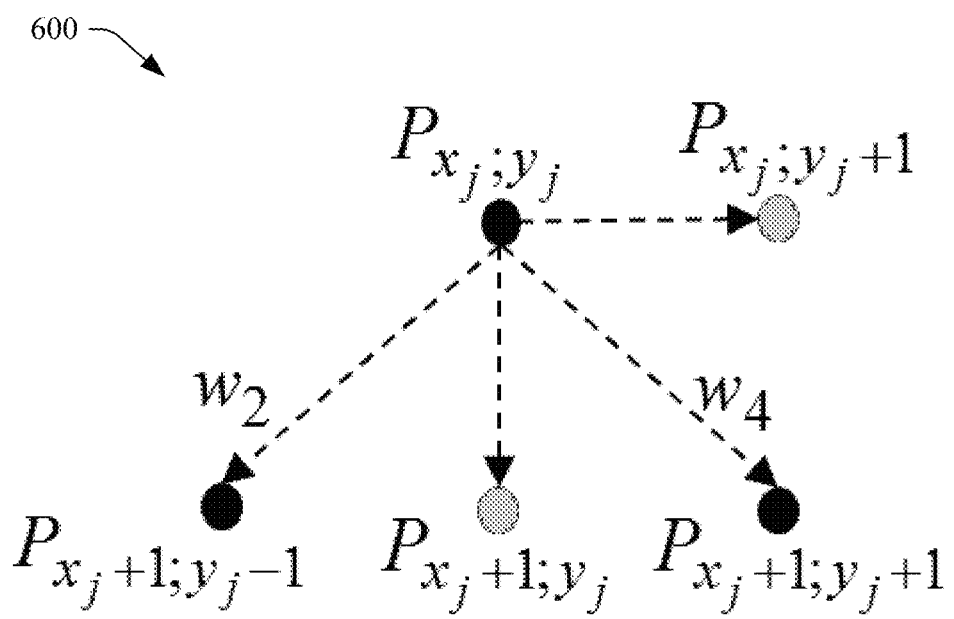
FIG. 6 illustrates a diagram of an example complex hologram portion comprising dead pixels to facilitate illustrating how dead pixels can be managed during processing of pixels of a complex hologram, in accordance with various aspects and embodiments of the disclosed subject matter.

FIG. 6 presents a diagram of an example complex hologram portion 600 comprising dead pixels to facilitate illustrating how the hologram processor component 106 manages dead pixels during processing of pixels of a complex hologram, in accordance with various aspects and embodiments of the disclosed subject matter. As depicted in the example complex hologram portion 600, pixels $P_{x_j,y_j+1}$ and $P_{x_j+1,y_j}$ (highlighted in grey tone) can be dead pixels. In such instance, the hologram processor component 106 can determine that it will only diffuse the error of pixel $P_{x_j,y_j}$ to pixels $P_{x_j+1,y_j-1}$ and $P_{x_j+1,y_j+1}$. The hologram processor component 106 also can determine that it will increase the coefficients $w_2$ and $w_4$ by a factor $$C = \frac{1}{(w_2 + w_4)}$$

and can the hologram processor component 106 can increase the coefficients $w_2$ and $w_4$ by a factor $$C = \frac{1}{(w_2 + w_4)},$$

accordingly. If it happens that all of the four neighbor pixels associated with the scanned and converted (e.g., to phase value) pixel are dead pixels, the hologram processor component 106 will not diffuse the error of the scanned and converted pixel to its neighbor pixels.

Figure 7:
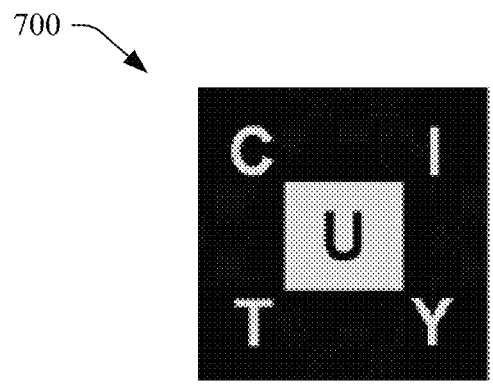
FIG. 7 presents an example binary image.
Figure 8:
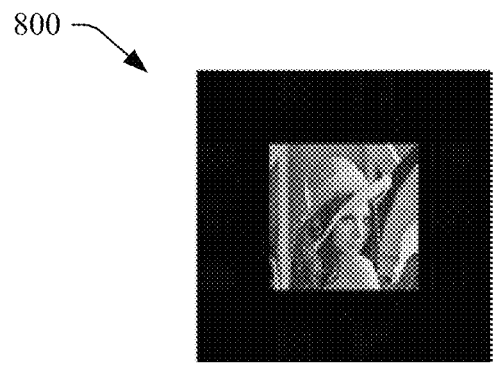
FIG. 8 presents an example smooth image.
Figure 9:
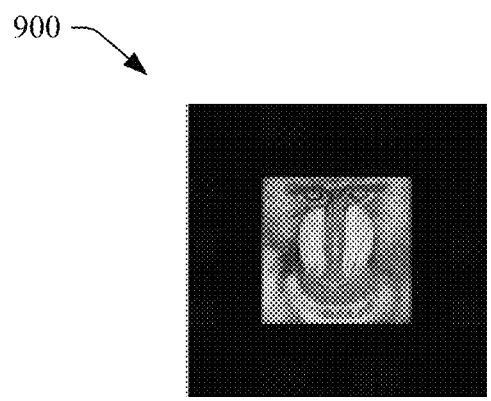
FIG. 9 presents an example highly textural image.

Experimental results based on implementation of various aspects of the disclosed subject matter, including the UERD process and the BERD process, are also disclosed herein. FIGS. 7, 8, and 9 present an example binary image 700 of "CITYU", an example smooth image 800 known as "Lenna", and an example highly textural image 900 known as "Baboon", respectively. The images 700, 800, and 900 are employed to facilitate evaluating the various aspects of the disclosed subject matter, including the UERD process and the BERD process. Equation (1) is applied (e.g., by the HGC 102 or another component) to generate the respective complex Fresnel holograms of the images 700, 800, and 900. The respective complex Fresnel holograms, as well as the test images 700, 800, and 900, are comprised of 2048×2048 pixels, each having a square size of 7 µm×7 µm. The wavelength of the optical beam is 650 nm. All of the images are parallel to, and located at 0.3 m from the hologram plane. The numerical reconstructed images of the 3 complex holograms are identical to the original images, and hence are not shown herein.

Figure 10:
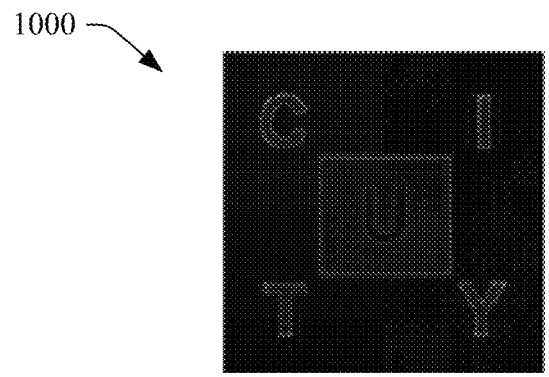
FIG. 10 presents a numerical reconstructed image of the respective holograms of the example binary image with the magnitude component removed.
Figure 11:
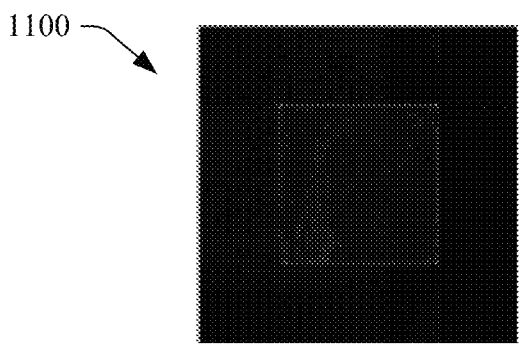
FIG. 11 presents a numerical reconstructed image of the respective holograms of the example smooth image with the magnitude component removed.
Figure 12:
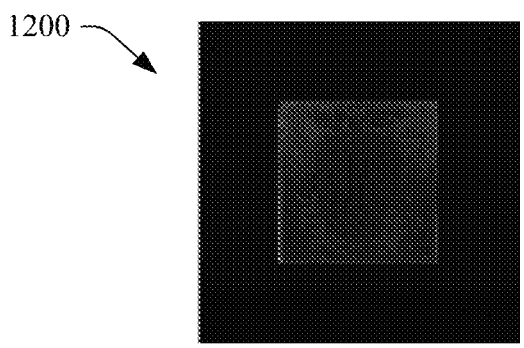
FIG. 12 presents a numerical reconstructed image of the respective holograms of the example highly textural image with the magnitude component removed.

Next, the magnitude component of each of the respective holograms can be removed (e.g., by the hologram processor component 106), in accordance with Equation (2). FIGS. 10, 11, and 12 present the numerical reconstructed images 1000, 1100, and 1200, respectively, of the respective holograms with their respective magnitude components removed. In FIGS. 10, 11, and 12, it can be observed that the shaded regions of the numerical reconstructed images 1000, 1100, and 1200 are removed extensively, leaving behind mostly the edges of the images.

Figure 13:
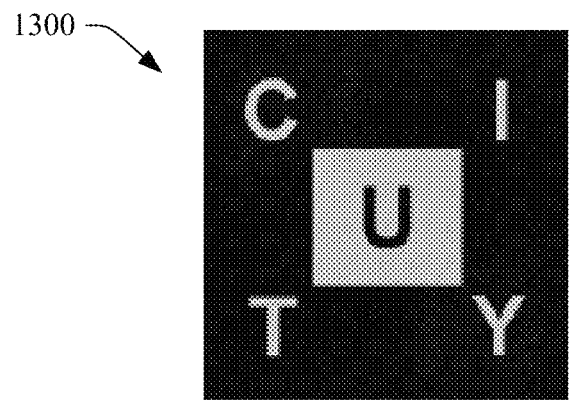
FIG. 13 presents a reconstructed image of a phase hologram, representing the example binary image, that has been derived from converting the complex hologram of the example binary image to the phase hologram, based at least in part on performing the undirectional error diffusion (UERD) process on the complex hologram, in accordance with various aspects and embodiments of the disclosed subject matter.
Figure 14:
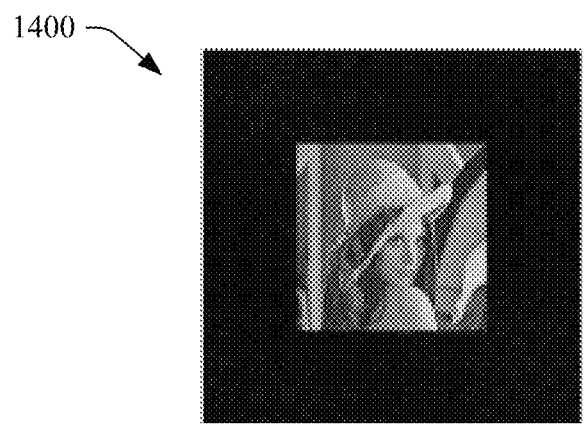
FIG. 14 presents a reconstructed image of a phase hologram, representing the example smooth image, that has been derived from converting the complex hologram of the example smooth image to the phase hologram, based at least in part on performing the UERD process on the complex hologram, in accordance with various aspects and embodiments of the disclosed subject matter.
Figure 15:
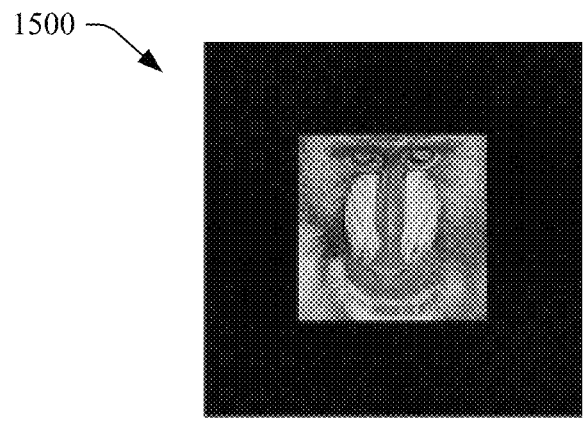
FIG. 15 presents a reconstructed image of a phase hologram, representing the example highly textural image, that has been derived from converting the complex hologram of the example highly textural image to the phase hologram, based at least in part on performing the UERD process on the complex hologram, in accordance with various aspects and embodiments of the disclosed subject matter.

To facilitate overcoming this problem, the disclosed UERD process can be applied (e.g., by the hologram processor component 106) to the complex hologram to convert the complex holograms into phase-only holograms (POHs). FIGS. 13, 14, and 15 present reconstructed images 1300, 1400, and 1500, respectively, of the respective POHs derived from converting the respective complex holograms to the respective POHs, based at least in part on performing the UERD process on the respective complex holograms, in accordance with various aspects and embodiments of the disclosed subject matter. In FIGS. 13, 14, and 15, it can be observed that the reconstructed images 1300, 1400, and 1500 have a visual appearance and quality that are close or at least substantially close to the appearance and visual quality of the original images 700, 800, and 900 presented in FIGS. 7, 8, and 9, respectively. However, it also can be observed that there is a certain amount of noise contamination, especially in the dark areas of the respective images 1300, 1400, and 1500.

Figure 16:
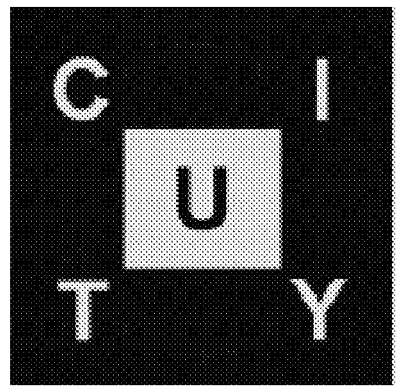
FIG. 16 presents the numerical reconstructed image of a BERD hologram, representing the example binary image, that was generated using the disclosed BERD process, in accordance with various aspects and embodiments of the disclosed subject matter.
Figure 17:
FIG. 17 presents the numerical reconstructed image of a BERD hologram, representing the example smooth image, that was generated using the disclosed BERD process, in accordance with various aspects and embodiments of the disclosed subject matter.
Figure 18:
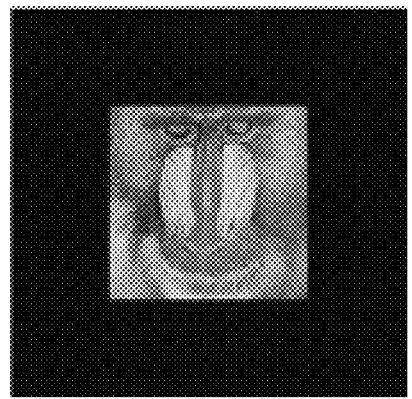
FIG. 18 presents the numerical reconstructed image of a BERD hologram, representing the highly textural image, that was generated using the disclosed BERD process, in accordance with various aspects and embodiments of the disclosed subject matter.

The BERD process also can be performed facilitate overcoming the problems observed in the numerical reconstructed images 1000, 1100, and 1200 of FIGS. 10, 11, and 12, respectively. The disclosed BERD process can be applied to the complex hologram to convert the complex hologram to obtain a BERD hologram. FIGS. 16, 17, and 18 present the numerical reconstructed images 1600, 1700, and 1800, respectively, of the BERD holograms generated (e.g., by the hologram processor component 106) using the disclosed BERD process, in accordance with various aspects and embodiments of the disclosed subject matter. As can be observed in FIGS. 16, 17, and 18, the respective numerical reconstructed images 1600, 1700, and 1800 are similar to the original images 700, 800, and 900 presented in FIGS. 7, 8, and 9, and the noise signals are not noticeable. Quantitative evaluation on the quality of the reconstructed images of the POHs derived from the direct removal of the magnitude component, from the UERD process, and from the BERD process, as compared from the reconstructed images obtained using the complex holograms, are provided in Table I. Evidently, the disclosed BERD process for generating BERD holograms can result in higher fidelity (e.g., in terms of peak signal-to-noise ratio (PSNR)) over that of the process for mere direct removal of the magnitude component and the UERD process, and the UERD process can result in higher fidelity (e.g., in terms of PSNR) over that of the process for mere direct removal of the magnitude component.

TABLE I

Quantitative comparison between the fidelity of the reconstructed images (with reference to the ones obtained from the original complex holograms) from phase-only holograms derived from different means. The reported values are PSNR values.

|  | CITYU | Lenna | Baboon |
|---|---|---|---|
| Direct removal of the magnitude component | 13.0 dB | 16.1 dB | 16.2 dB |
| Unidirectional error diffusion | 24.3 dB | 28.1 dB | 27.0 dB |
| Bidirectional error diffusion | 31.6 dB | 38.6 dB | 32.7 dB |

The disclosed subject matter can have a number of aspects relative to conventional systems, methods, and techniques for hologram processing and generation. One advantage of the disclosed subject matter over conventional systems, methods, and techniques can be that the reconstructed images of the BERD holograms generated in accordance with the disclosed subject matter can be similar to the reconstructed images obtained with the original complex holograms. Another advantage of the disclosed subject matter over conventional systems, methods, and techniques is that the disclosed subject matter can involve a relatively small amount of computation as compared to conventional systems, methods, and techniques, so that the conversion of a medium size, 2048×2048 pixel complex hologram can be realized quickly (e.g., at video rate or faster) by using a commodity personal computer that can implement various aspects and embodiments of the disclosed subject matter. Still another advantage of the disclosed subject matter over conventional systems, methods, and techniques is that the disclosed subject matter can be applied directly on an existing complex Fresnel hologram without the presence of the original object image.

Figure 19:
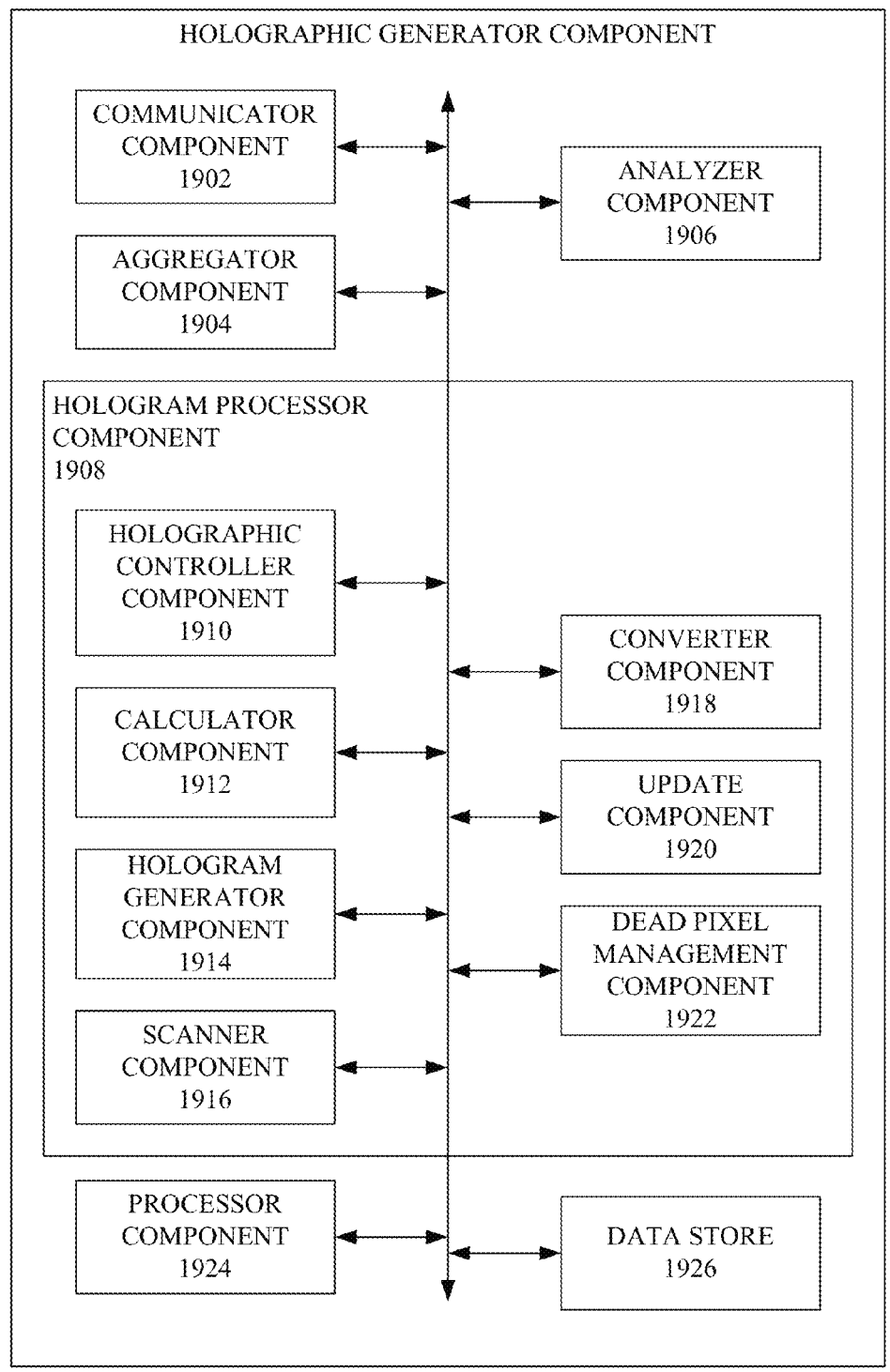
FIG. 19 illustrates a block diagram of an example holographic generator component that can efficiently generate a 3-D phase hologram(s) based at least in part on a 3-D complex hologram(s) of a real or synthetic 3-D object scene(s), in accordance with various aspects and implementations of the disclosed subject matter.

FIG. 19 illustrates a block diagram of an example HGC 1900 that can efficiently generate (e.g., at video rate or faster, in real or at least near real time) a 3-D phase hologram(s) (e.g., a full-parallax 3-D phase hologram(s)) based at least in part on a 3-D complex hologram(s) (e.g., a full-parallax complex 3-D Fresnel hologram(s)) of a real or synthetic 3-D object scene(s), in accordance with various aspects and implementations of the disclosed subject matter. The HGC 1900 can include a communicator component 1902 that can be used to communicate (e.g., transmit, receive) information between the HGC 1900 and other components (e.g., display component(s), scene capture device(s), processor component(s), user interface(s), data store(s), etc.). The information can include, for example, a real or synthetic 3-D object scene, holograms or holographic images, information relating defined hologram generation criterion(s), information relation to an algorithm(s) (e.g., UERD algorithm, BERD algorithm, etc.) that can facilitate generation of holograms or holographic images, etc.

The HGC 1900 can comprise an aggregator component 1904 that can aggregate data received (e.g., obtained) from various entities (e.g., scene capture device(s), display component(s), processor component(s), user interface(s), data store(s), etc.). The aggregator component 1904 can correlate respective items of data based at least in part on type of data, source of the data, time or date the data was generated or received, object point with which data is associated, row (e.g., odd row, even row) in a hologram (e.g., complex hologram) to which a member (e.g., pixel) belongs, member of a hologram for which another member(s) is a neighbor member, pixel with which a transparency level is associated, visual perspective with which data is associated, etc., to facilitate processing of the data (e.g., analyzing of the data by the analyzer component 1906).

The analyzer component 1906 can analyze data to facilitate converting complex values of members (e.g., pixels) in a complex hologram to phase values (e.g., phase-only or phase-specific values), updating values of specified neighbor members of a member in the complex hologram to facilitate diffusing an error associated with the member due to the conversion to the specified neighbor members of the member, generating a phase hologram (e.g., a POH, phase-specific hologram, or pure phase hologram) associated with an object scene (e.g., 3-D object scene) based at least in part on the complex hologram, identifying a dead pixel(s) in a complex hologram, setting values (e.g., values for the real part and imaginary part) for a dead pixel(s), setting coefficients and/or weightings in connection with a dead pixel(s), and/or identifying elements (e.g., object points, features, etc.) of a 3-D object scene to facilitate generating a hologram (e.g., phase hologram), etc., and can generate analysis results, based at least in part on the data analysis. Based at least in part on the results of this analysis, the HGC 1900 (e.g., using the hologram processor component 1908) can generate a complex hologram based at least in part on an object scene, convert complex values of members in a complex hologram to phase values, update values of specified neighbor members of a member (e.g., with its complex value converted to a phase value) in the complex hologram to facilitate diffusing an error associated with the member due to the conversion to the specified neighbor members of the member, generate a phase hologram associated with an object scene based at least in part on the complex hologram, identify a dead pixel(s) in a complex hologram, determine and/or set values (e.g., values for the real part and imaginary part) for a dead pixel(s), determine and/or set coefficients and/or weightings in connection with a dead pixel(s), and/or identify elements (e.g., object points, features, etc.) of a 3-D object scene to facilitate generating a hologram, or perform other processes on data relating to holograms.

The HGC 1900 can include the hologram processor component 1908 that can process a complex hologram to generate a phase hologram that can be displayed using a display component, comprising, for example, a phase-only display device. In accordance with various aspects and embodiments, based at least in part on the analysis results, the hologram processor component 1908 can generate a complex hologram based at least in part on an object scene, convert complex values of members in a complex hologram to phase values, update values of specified neighbor members of a member (e.g., with its complex value converted to a phase value) in the complex hologram to facilitate diffusing an error associated with the member due to the conversion to the specified neighbor members of the member, generate a phase hologram associated with an object scene based at least in part on the complex hologram, identify a dead pixel(s) in a complex hologram, determine and/or set values (e.g., values for the real part and imaginary part) for a dead pixel(s), determine and/or set coefficients and/or weightings in connection with a dead pixel(s), and/or identify elements (e.g., object points, features, etc.) of a 3-D object scene to facilitate generating a hologram, or perform other processes on data relating to holograms. In some implementations, the hologram processor component 1908 can comprise, for example, a holographic controller component 1910, a calculator component 1912, a hologram generator component 1914, a scanner component 1916, a converter component 1918, an update component 1920, and/or a dead pixel management component 1922.

The holographic controller component 1910 can control operations relating to processing and generating a complex hologram (e.g., a full-parallax complex 3-D Fresnel hologram), generating a phase hologram based at least in part on the complex hologram, and/or generating corresponding reconstructed holographic images based at least in part on the phase hologram. The holographic controller component 1910 can facilitate controlling operations being performed by various components of the hologram processor component 1908, controlling data flow between various components of the hologram processor component 1908, controlling data flow between the hologram processor component 1908 and other components of the HGC 1900, etc.

The calculator component 1912 can perform calculations on data (e.g., data with respective values), in accordance with various equations (e.g., mathematical expressions), to facilitate generating a complex hologram, generating a phase hologram based at least in part on a complex hologram, converting a complex value of a member of a complex hologram to a phase value, updating complex values of specified neighbor members of a member that has had its complex value converted to a phase value, determining or calculating values for dead pixels, determining or calculating coefficients or weightings associated with dead pixels, etc. The calculator component 1912 can facilitate calculating, for example, results for one or more equations relating to generating or processing phase holograms, including the equations disclosed herein.

The hologram generator component 1914 can facilitate generating a complex hologram that can represent an object scene at a desired rate (e.g., at video rate or a faster rate (e.g., up to approximately 40 frames per second or faster)), for example, using one or more of the fast hologram generation techniques, processes, or methods, as disclosed herein. The hologram generator component 1914 also can facilitate processing a complex hologram to generate a phase hologram that can correspond to the complex hologram at a desired rate (e.g., at video rate or a faster rate (e.g., up to approximately 40 frames per second or faster)).

The scanner component 1916 can visit, scan, analyze, or examine members (e.g., pixels) of a complex hologram to facilitate converting the complex values of members to phase values. The scanner component 1916 also can facilitate determining the complex values of respective members of the complex hologram. The scanner component 1916 can scan members of a complex hologram, in accordance with, for example, a UERD process or BERD process, as more fully disclosed herein. For example, when the UERD process is employed, the scanner component 1916 can visit, scan, analyze, or examine members of a complex hologram in a row by row manner (e.g., scanning pixels in a first row, scanning pixels in a second row, and so on), for example, in a left to right manner (e.g., by scanning a pixel in a row, scanning a next pixel that is to the right of the pixel in the row, and so on). When the BERD process is employed, the scanner component 1916 can visit, scan, analyze, or examine members of an odd row of a complex hologram in a first direction (e.g., left-to-right direction), and can visit, scan, analyze, or examine members of an even row of the complex hologram in a second direction (e.g., right-to-left direction).

The converter component 1918 can convert the complex value of a member of a hologram to a phase value (e.g., a phase-only or phase-specific value). For instance, the converter component 1918 can set or modify the magnitude of each member to a desired constant value (e.g., a value of unity, so that the magnitude component of the member can be transparent), which can remove the magnitude information, for example, in accordance with Equation (2).

The update component 1920 can facilitate updating the complex values of certain (e.g., specified, not yet visited) neighbor members in a complex hologram that are in proximity to a member that has had its complex value modified or converted to a phase value. The update component 1920 can perform the updates of the complex values of these certain neighbor members to facilitate diffusing an error, which is associated with the conversion of the complex value of the member to the phase value, to these certain neighbor members, as more fully disclosed herein (e.g., in accordance with the applicable equations disclosed herein, and the processes (e.g., UERD process, BERD process) disclosed herein).

The dead pixel management component 1922 can be employed to facilitate managing any dead pixels that are identified or detected in a complex hologram. The dead pixel management component 1922 can facilitate decreasing the sensitivity of a phase hologram towards dead pixels (e.g., pixels that are opaque, or transparent with no phase shift, or a constant phase shift that is independent to the value applied to the pixel). For example, for a dead pixel that is opaque, the dead pixel management component 1922 can set or modify the values (e.g., complex and imaginary parts) of such dead pixel to zero. For a dead pixel that is transparent with no phase shift, the dead pixel management component 1922 can set or modify the real part and imaginary part of the dead pixel's value to unity (e.g., one) and zero, respectively. For a dead pixel with a constant phase shift $\phi$, the dead pixel management component 1922 can set or modify the values of the dead pixel's real part and imaginary part to $\cos(\alpha)$ and $\sin(\phi)$, respectively. The dead pixel management component 1922 also can facilitate determining or modifying weighting factors or coefficient values applied during an error diffusing process to facilitate accounting for the dead pixels, as more fully disclosed herein.

The HGC 1900 also can comprise a processor component 1924 that can operate in conjunction with the other components (e.g., communicator component 1902, aggregator component 1904, analyzer component 1906, hologram processor component 1908, etc.) to facilitate performing the various functions of the HGC 1900. The processor component 1924 can employ one or more processors (e.g., central processing units (CPUs), GPUs, FPGAs, etc.), microprocessors, or controllers that can process data, such as information (e.g., visual information) relating to an object scene (e.g., 3-D object scene), holographic data, data relating to parameters associated with the HGC 1900 and associated components, etc., to facilitate generating holograms (e.g., full-parallax complex 3-D Fresnel hologram, phase hologram based on the complex hologram) and corresponding holographic images representative of a 3-D object scene; and can control data flow between the HGC 1900 and other components associated with the HGC 1900.

In yet another aspect, the HGC 1900 can contain a data store 1926 that can store data structures (e.g., user data, metadata); code structure(s) (e.g., modules, objects, classes, procedures), commands, or instructions; information relating to object points; information relating to (e.g., representative of) an object scene; model data; holographic data; information relating to generating a hologram, converting a complex value of a member of a complex hologram to a phase value, diffusing an error associated with a member to certain neighbor members of the member, managing dead pixels in a complex hologram, etc.; parameter data; algorithms (e.g., algorithm(s) relating to fast generation of holograms at a desired rate (e.g., at video rate or faster); algorithm(s) relating to generating a complex hologram; UERD algorithm; BERD algorithm; etc.); criterion(s) relating to hologram generation; and so on. In an aspect, the processor component 1924 can be functionally coupled (e.g., through a memory bus) to the data store 1926 in order to store and retrieve information desired to operate and/or confer functionality, at least in part, to the communicator component 1902, aggregator component 1904, analyzer component 1906, hologram processor component 1908, etc., and/or substantially any other operational aspects of the HGC 1900. It is to be appreciated and understood that the various components of the HGC 1900 can communicate information between each other and/or between other components associated with the HGC 1900 as desired to carry out operations of the HGC 1900. It is to be further appreciated and understood that respective components (e.g., communicator component 1902, aggregator component 1904, analyzer component 1906, hologram processor component 1908, etc.) of the HGC 1900 each can be a stand-alone unit, can be included within the HGC 1900 (as depicted), can be incorporated within another component of the HGC 1900 (e.g., hologram processor component 1908) or a component separate from the HGC 1900, and/or virtually any suitable combination thereof, as desired.

It is to be appreciated and understood that, in accordance with various other aspects and embodiments, the HGC 1900 or components associated therewith can include or be associated with other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reference beam component (e.g., to apply a reference beam to a 3-D object scene and/or a 3-D hologram), a render component (e.g., to render or convert data, such as model data or diffraction pattern data, associated with the 3-D object scene into corresponding holographic data, which can be used to generate a hologram that is a reproduction of the 3-D object scene), a reflector component(s) (e.g., to reflect holographic images to facilitate display of the hologram), and/or display partitions (e.g., to partition a display into a desired number of partitions in order to show different views of the hologram), etc., that can be employed to facilitate generating a hologram and/or generating or displaying corresponding holographic images representing a 3-D object scene.

Figure 20:
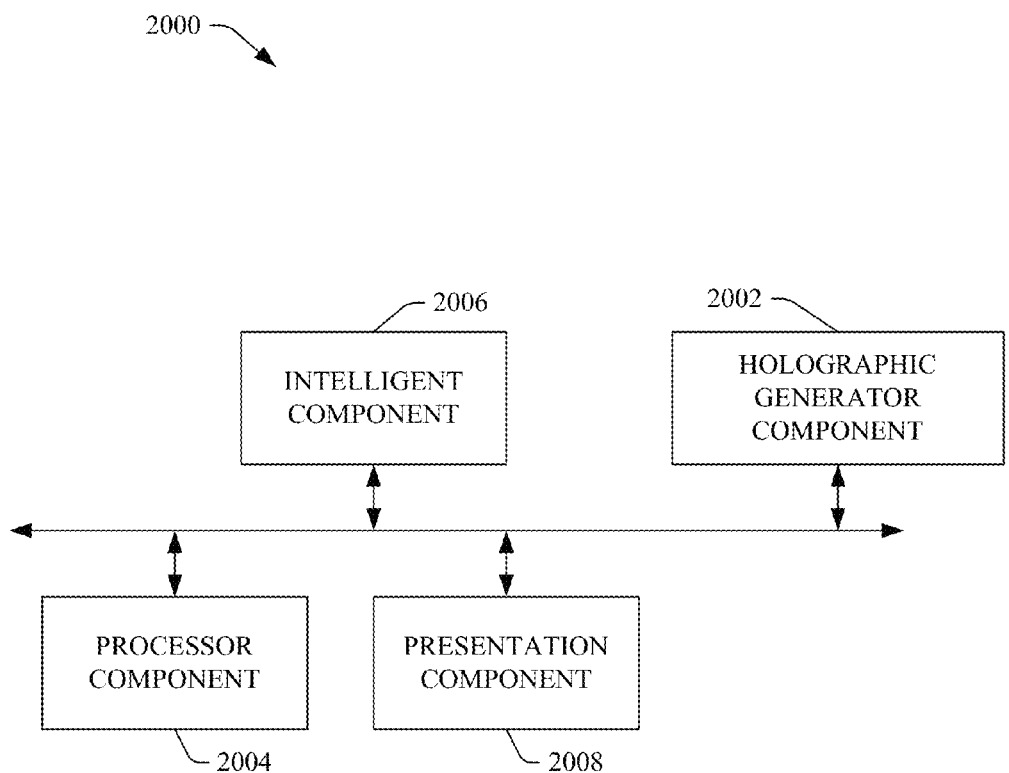
FIG. 20 depicts a system that can employ intelligence to facilitate converting a complex 3-D hologram of a real or synthetic 3-D object scene to a phase hologram to facilitate generating holographic images based at least in part on the phase hologram, in accordance with various aspects and embodiments of the disclosed subject matter.

Referring to FIG. 20, depicted is a block diagram of a system 2000 that can employ intelligence to facilitate converting a complex 3-D hologram (e.g., a full-parallax complex 3-D Fresnel hologram) of a real or synthetic 3-D object scene to a phase hologram to facilitate generating holographic images based at least in part on the phase hologram, in accordance with various aspects and embodiments of the disclosed subject matter. The system 2000 can include an HGC 2002 that can desirably generate a hologram (e.g., sequence of 3-D holographic images) that can represent a 3-D object scene (e.g., real or computer-synthesized 3-D object scene from multiple different viewing perspectives of a 3-D object scene that can correspond to multiple different viewing perspectives of the 3-D object scene), as more fully disclosed herein. It is to be appreciated that the HGC 2002 can be the same or similar as respective components (e.g., respectively named components), and/or can contain the same or similar functionality as respective components, as more fully described herein. The HGC 2002 can include a hologram processor component (not shown in FIG. 20; e.g., as depicted in, or described herein in relation to FIG. 1) that can generate a full-parallax digital 3-D phase hologram (e.g., Fresnel hologram), based at least in part on the original full-parallax complex digital 3-D Fresnel hologram, to facilitate generating or reconstructing full-parallax digital 3-D holographic images (e.g., 3-D Fresnel holographic images) that can represent or recreate the original real or synthetic 3-D object scene and can be desirably displayed (e.g., with a desirably high quality and resolution) on a display component (e.g., a phase-only display device, such as a phase-only SLM display device or a phase-only LCoS display device), as more fully disclosed herein.

The system 2000 can further include a processor component 2004 that can be associated with (e.g., communicatively connected to) the HGC 2002 and/or other components (e.g., components of system 2000) via a bus. In accordance with an embodiment of the disclosed subject matter, the processor component 2004 can be an applications processor(s) that can manage communications and run applications. For example, the processor component 2004 can be a processor that can be utilized by a computer, mobile computing device, personal data assistant (PDA), or other electronic computing device. The processor component 2004 can generate commands in order to facilitate generating holograms, converting complex holograms to phase holograms, diffusing respective errors of respective pixels of a complex hologram to neighbor pixels, and/or displaying of holographic images of a 3-D object scene from multiple different viewing perspectives corresponding to the multiple different viewing perspectives of the 3-D object scene obtained or created by the HGC 2002, modifying parameters associated with the HGC 2002, etc.

The system 2000 also can include an intelligent component 2006 that can be associated with (e.g., communicatively connected to) the HGC 2002, the processor component 2004, and/or other components associated with system 2000 to facilitate analyzing data, such as current and/or historical information, and, based at least in part on such information, can make an inference(s) and/or a determination(s) regarding, for example, converting a value of a pixel from a complex value to a phase value (e.g., a phase-only or phase-specific value), diffusing an error associated with converting a pixel to a neighbor pixel(s), determining a conversion process (e.g., UERD, BERD, etc.) to perform on a complex hologram to convert it to a phase hologram, managing the diffusion of an error associated with converting a value of a pixel from a complex value to a phase value to neighbor pixels when a neighbor pixel(s) is a dead pixel(s), to facilitate generating a 3-D hologram (e.g., a phase hologram that is based at least in part on the original complex hologram), and/or corresponding 3-D holographic images that can represent a 3-D object scene, determining and/or setting of parameters associated with the HGC 2002 and associated components, etc.

For example, based in part on current and/or historical evidence, the intelligent component 2006 can infer or determine a value (e.g., constant magnitude value) to apply to a pixel to facilitate converting the complex value to a phase value, an operation to perform in connection with diffusing an error associated with converting a pixel to a neighbor pixel(s), a type of conversion process (e.g., UERD, BERD, etc.) to perform on a complex hologram to convert it to a phase hologram, an operation to perform in connection with managing the diffusion of an error that is associated with converting a complex value of a pixel to a phase value to neighbor pixels when a neighbor pixel(s) is a dead pixel(s), respective parameter values of one or more parameters to be used with regard to the performing of operations by the HGC 2002, etc.

In an aspect, the intelligent component 2006 can communicate information related to the inferences and/or determinations to the HGC 2002. Based at least in part on the inference(s) or determination(s) made by the intelligent component 2006, the HGC 2002 can take (e.g., automatically or dynamically take) one or more actions to facilitate generating a 3-D hologram and/or a 3-D holographic image of a 3-D object scene from multiple different viewing perspectives corresponding to the multiple different viewing perspectives of a 3-D object scene obtained or generated by the HGC 2002. For instance, the HGC 2002 can determine, identify, and/or select a value (e.g., constant magnitude value) to apply to a pixel to facilitate converting the complex value to a phase value, an operation to perform in connection with diffusing an error associated with converting a pixel to a neighbor pixel(s), a type of conversion process (e.g., UERD, BERD, etc.) to perform on a complex hologram to convert it to a phase hologram, an operation to perform in connection with managing the diffusion of an error that is associated with converting a complex value of a pixel to a phase value to neighbor pixels when a neighbor pixel(s) is a dead pixel(s), respective parameter values of one or more parameters to be used with regard to the performing of operations by the HGC 2002, etc., to facilitate generating a 3-D hologram (e.g., a 3-D phase hologram) and/or 3-D holographic images of a 3-D object scene, as disclosed herein.

It is to be understood that the intelligent component 2006 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 2000 also can include a presentation component 2008, which can be connected with the processor component 2004. The presentation component 2008 can provide various types of user interfaces to facilitate interaction between a user and any component coupled to the processor component 2004. As depicted, the presentation component 2008 is a separate entity that can be utilized with the processor component 2004 and associated components. However, it is to be appreciated that the presentation component 2008 and/or similar view components can be incorporated into the processor component 2004 and/or can be a stand-alone unit. The presentation component 2008 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 2004.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the HGC 2002 and/or other components, can be situated or implemented on a single integrated-circuit chip. In accordance with another embodiment, the HGC 2002, and/or other components, can be implemented on an application-specific integrated-circuit (ASIC) chip. In yet another embodiment, the HGC 2002 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 21:
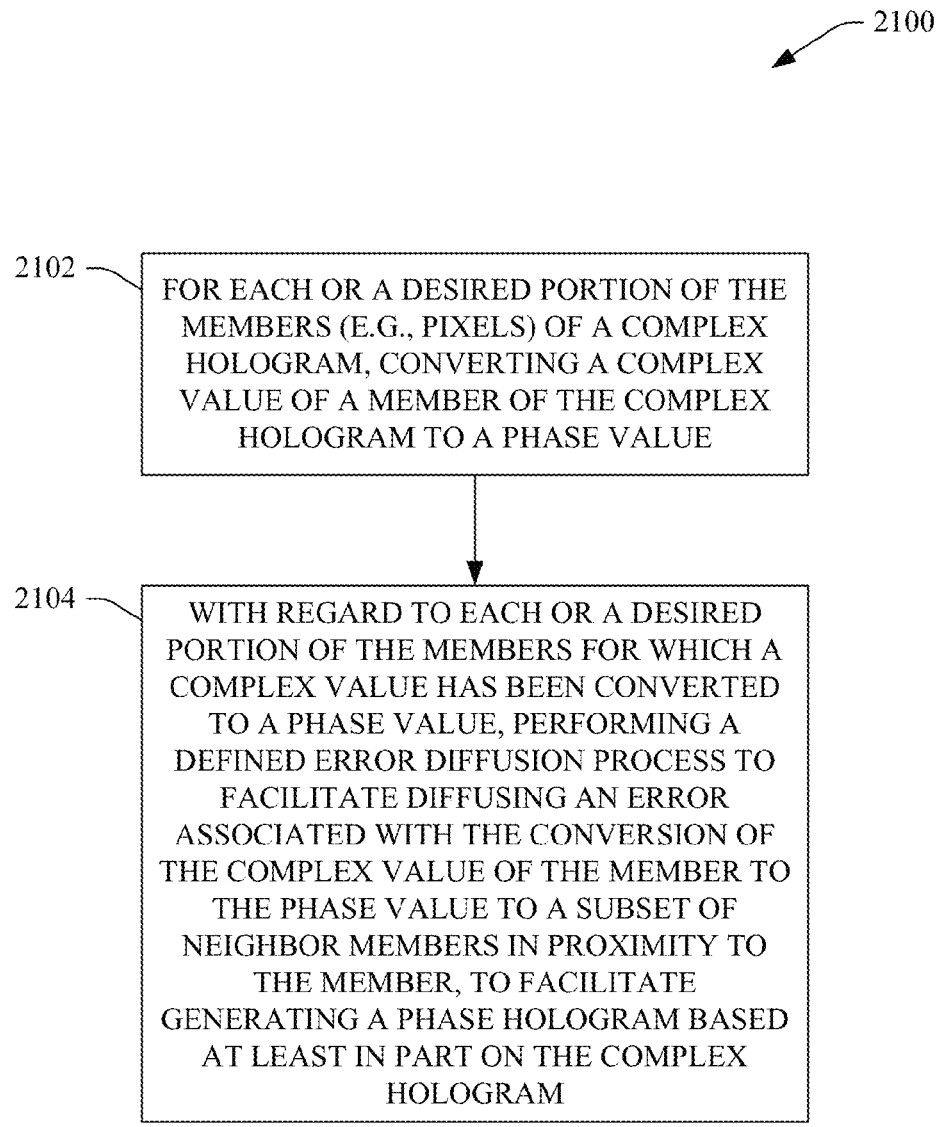
FIG. 21 illustrates a flow diagram of an example method that can efficiently and quickly convert a complex 3-D hologram(s) of a real or synthetic 3-D object scene(s) to generate a phase hologram(s), in accordance with various aspects and embodiments of the disclosed subject matter.
Figure 22:
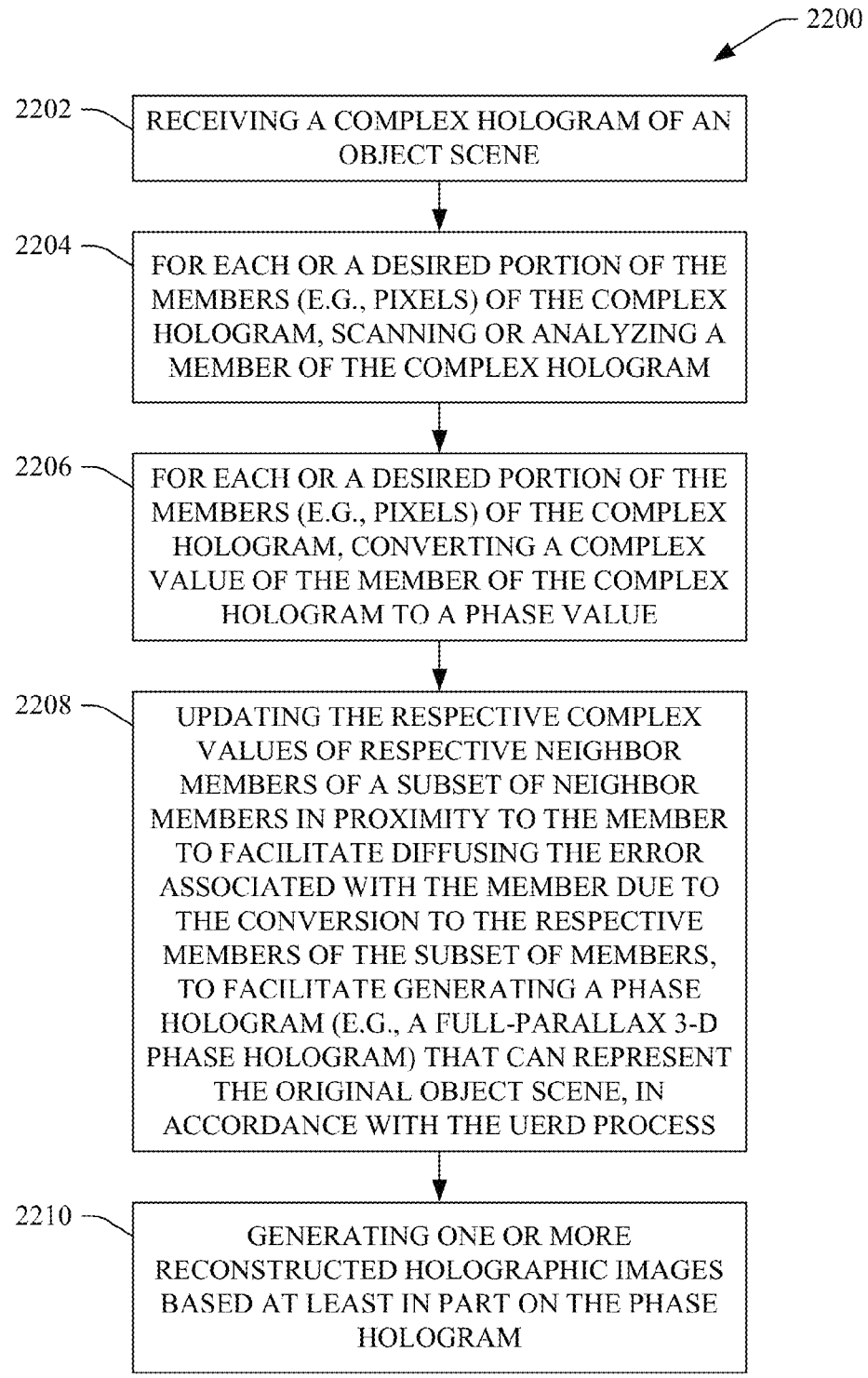
FIG. 22 depicts a flow diagram of another example method that can efficiently and quickly convert a complex 3-D hologram(s) of a real or synthetic 3-D object scene(s) to generate a phase hologram(s) based at least in part on a UERD process, in accordance with various aspects and embodiments of the disclosed subject matter.
Figure 23:
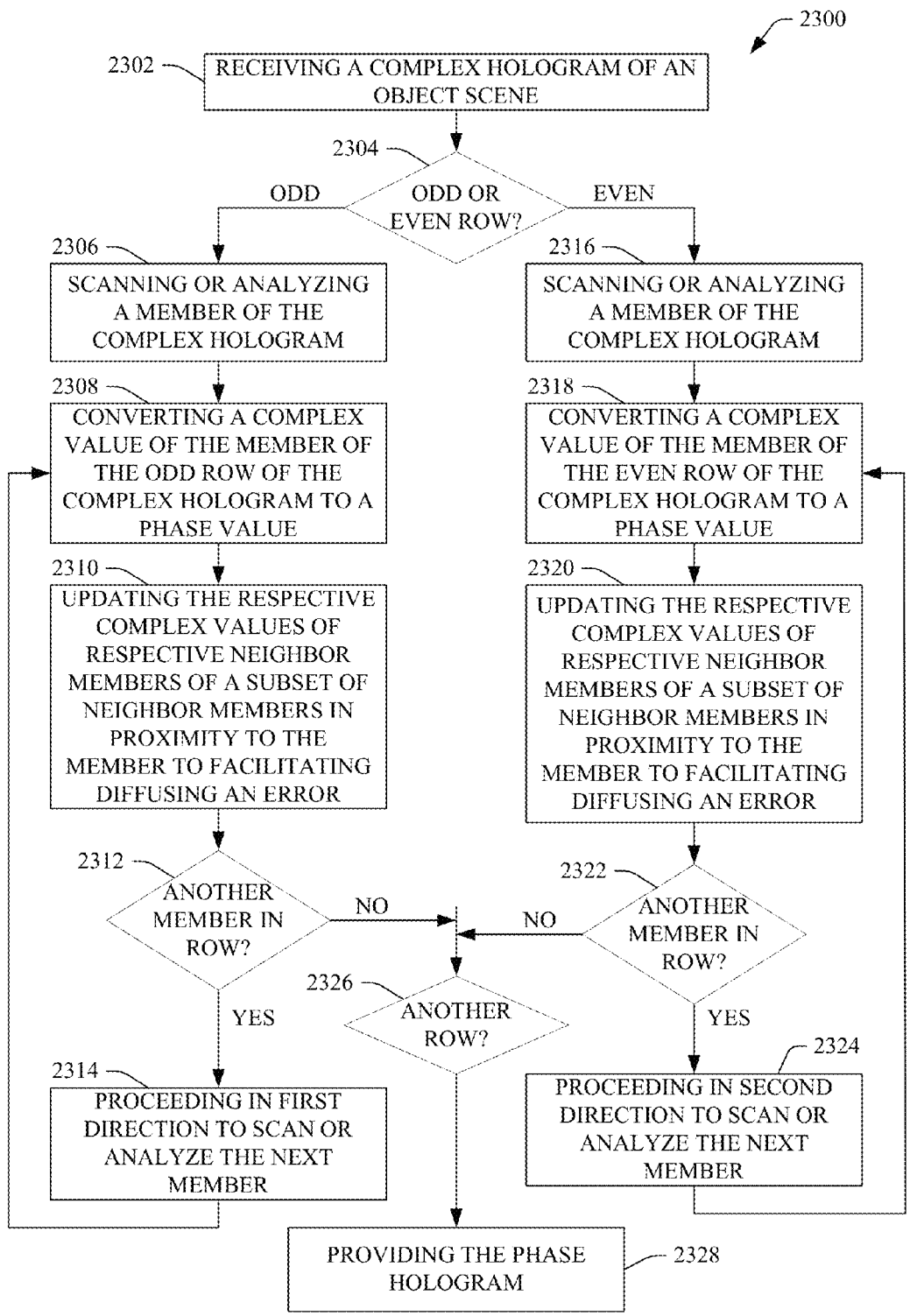
FIG. 23 presents a flow diagram of an example method that can efficiently and quickly convert a complex 3-D hologram(s) of a real or synthetic 3-D object scene(s) to generate a phase hologram(s) based at least in part on a BERD process, in accordance with various aspects and embodiments of the disclosed subject matter

FIGS. 21-23 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 21, illustrated is a flow diagram of an example method 2100 that can efficiently and quickly (e.g., at video rate or faster, in real time or at least near real time) convert a complex 3-D hologram(s) (e.g., a complex full-parallax 3-D Fresnel hologram(s)) of a real or synthetic 3-D object scene(s) to generate a phase hologram(s), in accordance with various aspects and embodiments of the disclosed subject matter. The method 2100 can be implemented by an HGC comprising a hologram processor component.

At 2102, for each or a desired portion of the members (e.g., pixels) of the complex hologram, a complex value of a member of the complex hologram can be converted to a phase value. The hologram processor component can receive or generate a complex hologram that can represent a 3-D object scene from a desired number of different visual perspectives of the original 3-D object scene. With regard to each or a desired portion of the members of the complex hologram, the hologram processor component can convert the complex value of a member of the complex hologram to a phase value (e.g., phase-only, phase-specific, or pure phase value). For instance, as part of employing the UERD process or BERD process, the hologram processor component can scan, analyze, or examiner each or a desired portion of the members of the complex hologram, and can convert the complex value of a member of the complex hologram to a phase value for each or a desired portion of the members of the complex hologram, as more fully disclosed herein.

At 2104, with regard to each or a desired portion of the members for which a complex value has been converted to a phase value, a defined error diffusion process can be performed to facilitate diffusing an error associated with the conversion of the complex value of the member to the phase value to a subset of neighbor members in proximity to the member, to facilitate generating a phase hologram based at least in part on the complex hologram. The hologram processor component can perform the defined error diffusion process to facilitate diffusing the error associated with the conversion of the complex value of the member to the phase value to the subset of neighbor members in proximity to the member, to facilitate compensating for or reducing the effect of the error on the other members (e.g., the subset of neighbor members) of the hologram, and generating a phase hologram based at least in part on the complex hologram. The defined diffusion process can be, for example, the UERD process or the BERD process. The subset of neighbor members of the member can comprise members that are in proximity to (e.g., adjacent to, adjoining, near to, or within a defined distance of) the member that have not been visited or scanned yet by the hologram processor component.

The HGC and/or display component can facilitate generating and displaying holographic images that can represent an original object scene, based at least in part on the phase hologram, for presentation to an observer(s), wherein the holographic images can be full-parallax 3-D holographic images that can represent the original 3-D object scene from different visual perspectives of the original 3-D object scene. The reconstructed holographic images can be generated, for example, by applying a coherent optical beam to the phase hologram.

Turning to FIG. 22, depicted is a flow diagram of an example method 2200 that can efficiently and quickly (e.g., at video rate or faster, in real time or at least near real time) convert a complex 3-D hologram(s) (e.g., a complex full-parallax 3-D Fresnel hologram(s)) of a real or synthetic 3-D object scene(s) to generate a phase hologram(s) based at least in part on a UERD process, in accordance with various aspects and embodiments of the disclosed subject matter. The method 2200 can be implemented by an HGC comprising a hologram processor component, a display component, and/or another component.

At 2202, a complex hologram of an object scene can be received. The HGC can generate or obtain a complex hologram (e.g., a complex full-parallax 3-D digital Fresnel hologram) that can represent a 3-D object scene from a desired number of visual perspectives. The complex hologram can be based at least in part on a real and/or synthetic 3-D object scene. The hologram processor component can receive the complex hologram of the 3-D object scene.

At 2204, for each or a desired portion of the members (e.g., pixels) of the complex hologram, a member of the complex hologram can be scanned or analyzed. The hologram processor component can scan or analyze the member of the complex hologram. In accordance with the UERD process, the hologram processor component can scan or analyze the members of the complex hologram in a row by row manner (e.g., scanning pixels in a first row, scanning pixels in a second row, and so on (e.g., from a top row down to a bottom row of the complex hologram), for example, in a left to right manner (e.g., by scanning a pixel in a row, scanning a next pixel that is to the right of the pixel in the row, and so on).

At 2206, for each or a desired portion of the members (e.g., pixels) of the complex hologram, a complex value of the member (e.g., member that was scanned or analyzed at 2204) of the complex hologram can be converted to a phase value. With regard to each or a desired portion of the members of the complex hologram, the hologram processor component can convert the complex value of a member of the complex hologram to a phase value (e.g., phase-only, phase-specific, or pure phase value). For instance, as part of employing the UERD process, the hologram processor component can scan, analyze, or examine each or a desired portion of the members of the complex hologram, and can convert the complex value of a member (e.g., member that was scanned) of the complex hologram to a phase value for each or a desired portion of the members of the complex hologram, as more fully disclosed herein.

At 2208, for each member that has had its complex value converted to a phase value, the respective complex values of respective neighbor members of a subset of neighbor members in proximity to the member can be updated to facilitate diffusing the error associated with the member due to the conversion to the respective members of the subset of members, to facilitate generating a phase hologram (e.g., a full-parallax 3-D phase hologram) that can represent the original object scene, in accordance with the UERD process. The subset of neighbor members can comprise, for example, members of the complex hologram that are in proximity to (e.g., adjacent to, adjoining, near to, or within a defined distance of) the member that have not been visited or scanned yet by the hologram processor component. With respect to each member that has had its complex value converted to a phase value, the hologram processor component can update the respective complex values of the respective neighbor members of the subset of neighbor members in proximity to the member to facilitate diffusing the error associated with the member to the respective neighbor members of the subset of members. For instance, as part of the UERD process, the hologram processor component can update the respective complex values (e.g., complex quantities) of the respective neighbor members of the subset of neighbor members by respective defined error-based values to generate respective new or updated complex values for those respective neighbor members, based at least in part on the error associated with the member due to the conversion and respective defined constant coefficients applicable to the respective neighbor members of the subset of neighbor members, to facilitate compensating for or reducing the effect of such error associated with the member, as more fully disclosed herein.

The hologram processor component can continue to perform the method 2200, in accordance with the UERD process, for all or a desired portion of the members of the complex hologram to facilitate desirably converting the respective complex values of the members to respective phase values, and diffusing error associated with a given member, after its conversion, to neighbor members in the subset of neighbor members (e.g., neighbor members that have not been visited or scanned) in proximity to that member to generate respective updated complex values for those neighbor members in the subset of neighbor members. By performing this UERD process, the hologram processor component can convert the complex hologram to a phase hologram of desirable quality.

At 2210, one or more reconstructed holographic images can be generated based at least in part on the phase hologram. The HGC and/or display component can facilitate generating one or more reconstructed holographic images based at least in part on the phase hologram. The one or more reconstructed holographic images can represent and reproduce the original 3-D object scene from various visual perspectives. The display component can present the one or more reconstructed holographic images. In some implementations, the display component can be or can comprise, for example, a phase-only display device (e.g., a phase-only SLM display device, a phase-only LCoS display device, etc.).

FIG. 23 presents a flow diagram of an example method 2300 that can efficiently and quickly (e.g., at video rate or faster, in real time or at least near real time) convert a complex 3-D hologram(s) (e.g., a complex full-parallax 3-D Fresnel hologram(s)) of a real or synthetic 3-D object scene(s) to generate a phase hologram(s) based at least in part on a BERD process, in accordance with various aspects and embodiments of the disclosed subject matter. The method 2300 can be implemented by an HGC comprising a hologram processor component, a display component, and/or another component.

At 2302, a complex hologram of an object scene can be received. The HGC can generate or obtain a complex hologram (e.g., a complex full-parallax 3-D digital Fresnel hologram) that can represent a 3-D object scene from a desired number of visual perspectives. The complex hologram can be based at least in part on a real and/or synthetic 3-D object scene. The hologram processor component can receive the complex hologram of the 3-D object scene.

At 2304, a determination can be made regarding whether a row of members of the complex hologram to be processed is an odd row or an even row. The hologram processor component can determine whether the row of members (e.g., pixels) to be processed is an odd row or an even row. If it is determined that the row is an odd row, at 2306, the members of the odd row can be scanned in a first direction (e.g., in a left-to-right direction). In response to determining that the row to be processed is an odd row, the hologram processor component can visit, scan, and/or process the members of the odd row in the first direction.

At 2306, a member of the complex hologram can be scanned or analyzed. The hologram processor component can scan or analyze the member of the complex hologram. The first member of the odd row that can be scanned or analyzed by the hologram processor component can be the member located at a first end (e.g., a left end) of the odd row. During subsequent iterations, the hologram processor component can proceed in the first direction to scan or analyze a next member that is adjacent to the last member that was scanned or analyzed. As part of the scanning or analyzing of the member, the hologram processor component can determine the complex value (e.g., the magnitude value and phase value) of the member.

At 2308, a complex value of the member of the odd row of the complex hologram can be converted to a phase value. With regard to each member of the odd row of the complex hologram that is processed, the hologram processor component can convert the complex value of such member of the complex hologram to a phase value (e.g., phase-only, phase-specific, or pure phase value), as more fully disclosed herein.

At 2310, for each member of an odd row that has had its complex value converted to a phase value, the respective complex values of respective neighbor members of a subset of neighbor members in proximity to the member can be updated to facilitate diffusing the error associated with the member due to the conversion to the respective members of the subset of members, to facilitate generating a phase hologram (e.g., a full-parallax 3-D phase hologram) that can represent the original object scene, in accordance with the BERD process. The subset of neighbor members can comprise, for example, members of the complex hologram that are in proximity to (e.g., adjacent to, adjoining, near to, or within a defined distance of) the member that have not been visited or scanned yet by the hologram processor component. For example, if the first direction is a left-to-right direction, and the member (e.g., pixel) that had its complex value converted to a phase value is $P_{x_j,y_j}$ in the complex hologram, the neighbor members in the subset of neighbor members can comprise $P_{x_j,y_j+1}$, $P_{x_j+1,y_j-1}$, $P_{x_j+1,y_j}$, and $P_{x_j+1,y_j+1}$.

With respect to each member that has had its complex value converted to a phase value, the hologram processor component can update the respective complex values of the respective neighbor members of the subset of neighbor members in proximity to the member based at least in part on diffusing the error associated with the member to the respective neighbor members of the subset of neighbor members. For instance, as part of the BERD process, the hologram processor component can update the respective complex values (e.g., complex quantities) of the respective neighbor members of the subset of neighbor members by respective defined error-based values to generate respective new or updated complex values for those respective neighbor members, based at least in part on the error associated with the member due to the conversion of it complex value to a phase value and respective defined constant coefficients applicable to the respective neighbor members of the subset of neighbor members, to facilitate compensating for or reducing the effect of such error associated with the member, as more fully disclosed herein. For example, if the first direction is a left-to-right direction, the hologram processor component can facilitate updating the complex values of the respective neighbors in the subset of neighbor members, in accordance with Equations (4) through (7), as more fully disclosed herein.

At 2312, a determination can be made regarding whether there is another member in the odd row that remains to be scanned or visited. The hologram processor component can determine whether there is another member in the odd row that remains to be scanned or visited. If it is determined that there is another member in the odd row that remains to be scanned or visited, at 2314, proceeding in the first direction, the next member in the odd row can be scanned or analyzed, and the method 2300 can proceed to reference numeral 2308, and can continue to proceed from that point.

If, at 2312, it is determined that no members of the odd row remain to be scanned or visited, the method 2300 can proceed to reference numeral 2326; and, at 2326, a determination can be made regarding whether there is another row of members in the complex hologram that remains to be scanned or analyzed. The hologram processor component can determine whether there is another row that remains to be scanned or visited. If it is determined there is another row of members that remains to be scanned or visited, the method 2300 can return to reference numeral 2304, wherein it can be determined whether the next row is an odd row or an even row in the complex hologram, and the method 2300 can proceed to process the complex hologram from that point to facilitate generating a phase hologram.

If, at 2326, it is determined there is no row of members that remains to be scanned or visited in the complex hologram, the processing of the complex hologram to generate a phase hologram can be complete, and, at 2328, the phase hologram can be provided (e.g., as an output). In response to determining that there is no row of members that remains to be scanned or visited in the complex hologram, the hologram processor component can provide the phase hologram as an output. The HGC and/or display component (e.g., phase-only display device) can facilitate reconstructing holographic images, based at least in part on the phase hologram, for display by the display component. The reconstructed holographic images can represent and reproduce the original 3-D object scene from various visual perspectives.

Returning again to reference numeral 2304, if, at 2304, it is determined that the row is an even row, at 2316, the members of the even row can be scanned in a second direction (e.g., in a right-to-left direction). In response to determining that the row to be processed is an even row, the hologram processor component can visit, scan, and/or process the members of the even row in the second direction.

At 2318, a complex value of the member of the even row of the complex hologram can be converted to a phase value. With regard to each member of the even row of the complex hologram that is processed, the hologram processor component can convert the complex value of such member of the complex hologram to a phase value (e.g., phase-only, phase-specific, or pure phase value), as more fully disclosed herein.

At 2320, for each member of an even row that has had its complex value converted to a phase value, the respective complex values of respective neighbor members of a subset of neighbor members in proximity to the member can be updated to facilitate diffusing the error associated with the member due to the conversion to the respective members of the subset of members, to facilitate generating a phase hologram (e.g., a full-parallax 3-D phase hologram) that can represent the original object scene, in accordance with the BERD process. The subset of neighbor members can comprise, for example, members of the complex hologram that are in proximity to (e.g., adjacent to, adjoining, near to, or within a defined distance of) the member that have not been visited or scanned yet by the hologram processor component. For example, if the second direction is a right-to-left direction, and the member (e.g., pixel) that had its complex value converted to a phase value is $P_{x_j;y_j}$ in the complex hologram, the neighbor members in the subset of neighbor members can comprise $P_{x_j;y_j-1}$, $P_{x_j+1;y_j+1}$, $P_{x_j+1;y_j}$, and $P_{x_j+1;y_j-1}$.

With respect to each member that has had its complex value converted to a phase value, the hologram processor component can update the respective complex values of the respective neighbor members of the subset of neighbor members in proximity to the member based at least in part on diffusing the error associated with the member to the respective neighbor members of the subset of neighbor members. For instance, as part of the BERD process, the hologram processor component can update the respective complex values (e.g., complex quantities) of the respective neighbor members of the subset of neighbor members by respective defined error-based values to generate respective new or updated complex values for those respective neighbor members, based at least in part on the error associated with the member due to the conversion of it complex value to a phase value and respective defined constant coefficients applicable to the respective neighbor members of the subset of neighbor members, to facilitate compensating for or reducing the effect of such error associated with the member, as more fully disclosed herein. For example, if the first direction is a right-to-left direction, the hologram processor component can facilitate updating the complex values of the respective neighbors in the subset of neighbor members, in accordance with Equations (9) through (12), as more fully disclosed herein.

At 2322, a determination can be made regarding whether there is another member in the even row that remains to be scanned or visited. The hologram processor component can determine whether there is another member in the even row that remains to be scanned or visited. If it is determined that there is another member in the even row that remains to be scanned or visited, at 2324, proceeding in the second direction, the next member in the even row can be scanned or analyzed, and the method 2300 can proceed to reference numeral 2318, and can continue to proceed from that point.

If, at 2322, it is determined that no members of the even row remain to be scanned or visited, the method 2300 can proceed to reference numeral 2326; and, at 2326, a determination can be made regarding whether there is another row of members in the complex hologram that remains to be scanned or analyzed. The hologram processor component can determine whether there is another row that remains to be scanned or visited. If it is determined there is another row of members that remains to be scanned or visited, the method 2300 can return to reference numeral 2304, wherein it can be determined whether the next row is an odd row or an even row in the complex hologram, and the method 2300 can proceed to process the complex hologram from that point to facilitate generating the phase hologram.

As previously disclosed, if, at 2326, it is determined there is no row of members that remains to be scanned or visited in the complex hologram, the processing of the complex hologram to generate a phase hologram can be complete, and, at 2328, the phase hologram can be provided (e.g., as an output). In response to determining that there is no row of members that remains to be scanned or visited in the complex hologram, the hologram processor component can provide the phase hologram as an output. The HGC and/or display component (e.g., phase-only display device) can facilitate reconstructing holographic images, based at least in part on the phase hologram, for display by the display component. The reconstructed holographic images can represent and reproduce the original 3-D object scene from various visual perspectives.

Figure 24:
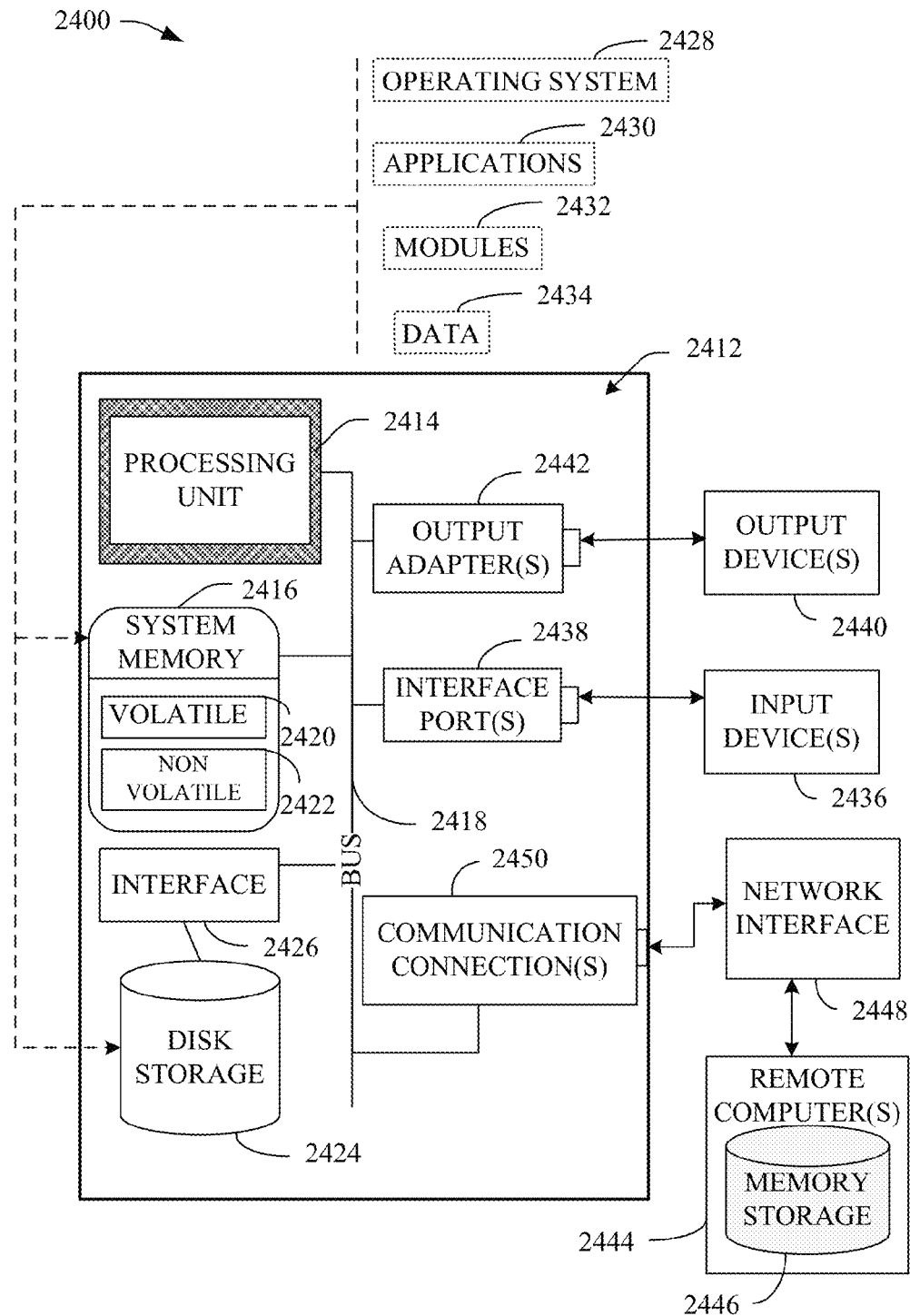
FIG. 24 is a schematic block diagram illustrating a suitable operating environment.
Figure 25:
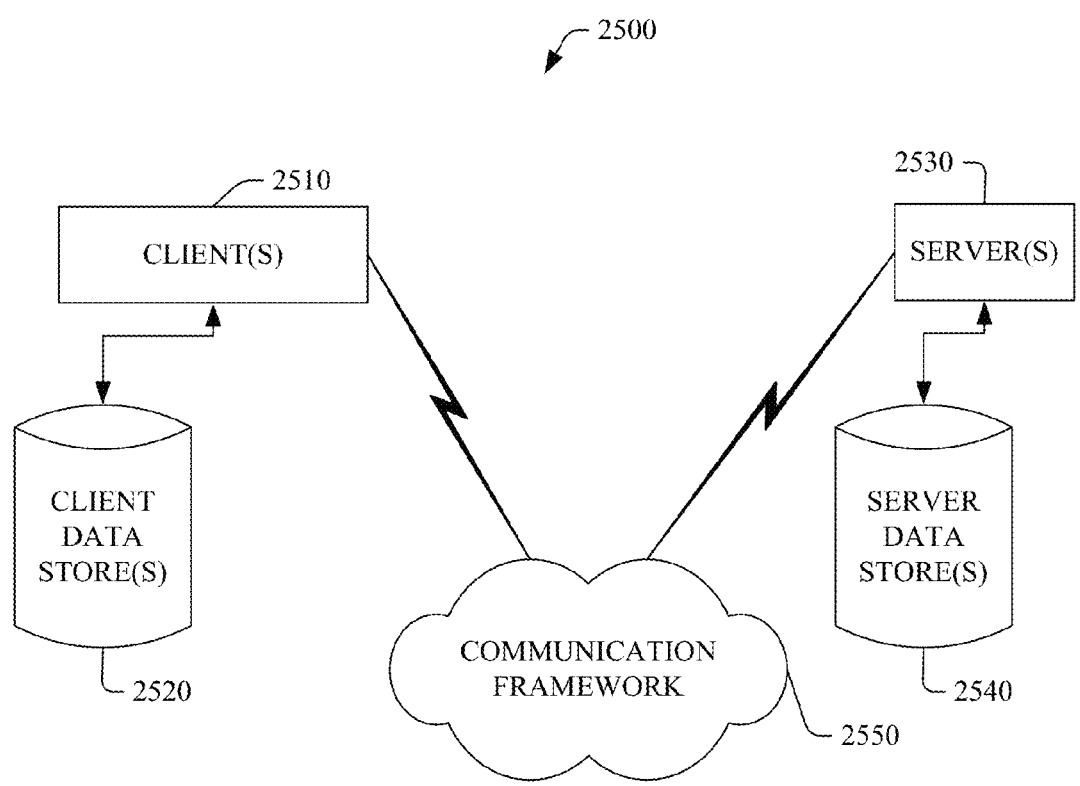
FIG. 25 is a schematic block diagram of a sample-computing environment.

In order to provide a context for the various aspects of the disclosed subject matter, FIGS. 24 and 25 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 24, a suitable environment 2400 for implementing various aspects of the claimed subject matter includes a computer 2412. The computer 2412 includes a processing unit 2414, a system memory 2416, and a system bus 2418. It is to be appreciated that the computer 2412 can be used in connection with implementing one or more of the systems or components (e.g., HGC, hologram processor component, display component, processor component, data store, etc.) shown and/or described in connection with, for example, FIGS. 1-23. The system bus 2418 couples system components including, but not limited to, the system memory 2416 to the processing unit 2414. The processing unit 2414 can be any of various available processors. Dual microprocessors and other multiprocessor architectures also can be employed as the processing unit 2414.

The system bus 2418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2416 includes volatile memory 2420 and nonvolatile memory 2422. The basic input/output system (BIOS), containing the basic routines to transfer information between elements within the computer 2412, such as during start-up, is stored in nonvolatile memory 2422. By way of illustration, and not limitation, nonvolatile memory 2422 can include read only memory (ROM), programmable ROM (PROM), electrically programmable ROM (EPROM), electrically erasable programmable ROM (EEPROM), or flash memory. Volatile memory 2420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2412 also can include removable/non-removable, volatile/non-volatile computer storage media. FIG. 24 illustrates, for example, a disk storage 2424. Disk storage 2424 includes, but is not limited to, devices like a magnetic disk drive, floppy disk drive, tape drive, Jaz drive, Zip drive, LS-100 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2424 to the system bus 2418, a removable or non-removable interface is typically used, such as interface 2426).

It is to be appreciated that FIG. 24 describes software that acts as an intermediary between users and the basic computer resources described in the suitable operating environment 2400. Such software includes an operating system 2428. Operating system 2428, which can be stored on disk storage 2424, acts to control and allocate resources of the computer system 2412. System applications 2430 take advantage of the management of resources by operating system 2428 through program modules 2432 and program data 2434 stored either in system memory 2416 or on disk storage 2424. It is to be appreciated that the claimed subject matter can be implemented with various operating systems or combinations of operating systems.

A user enters commands or information into the computer 2412 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2414 through the system bus 2418 via interface port(s) 2438. Interface port(s) 2438 include, for example, a serial port, a parallel port, a game port, and a universal serial bus (USB). Output device(s) 2440 use some of the same type of ports as input device(s) 2436. Thus, for example, a USB port may be used to provide input to computer 2412, and to output information from computer 2412 to an output device 2440. Output adapter 2442 is provided to illustrate that there are some output devices 2440 like monitors, speakers, and printers, among other output devices 2440, which require special adapters. The output adapters 2442 include, by way of illustration and not limitation, video and sound cards that provide a means of connection between the output device 2440 and the system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. The remote computer(s) 2444 can be a personal computer, a server, a router, a network PC, a workstation, a microprocessor based appliance, a peer device or other common network node and the like, and typically includes many or all of the elements described relative to computer 2412. For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2450 refers to the hardware/software employed to connect the network interface 2448 to the bus 2418. While communication connection 2450 is shown for illustrative clarity inside computer 2412, it can also be external to computer 2412. The hardware/software necessary for connection to the network interface 2448 includes, for exemplary purposes only, internal and external technologies such as, modems including regular telephone grade modems, cable modems and DSL modems, ISDN adapters, and Ethernet cards.

FIG. 25 is a schematic block diagram of a sample-computing environment 2500 with which the subject disclosure can interact. The system 2500 includes one or more client(s) 2510. The client(s) 2510 can be hardware and/or software (e.g., threads, processes, computing devices). The system 2500 also includes one or more server(s) 2530. Thus, system 2500 can correspond to a two-tier client server model or a multi-tier model (e.g., client, middle tier server, data server), amongst other models. The server(s) 2530 can also be hardware and/or software (e.g., threads, processes, computing devices). The servers 2530 can house threads to perform transformations by employing the subject disclosure, for example. One possible communication between a client 2510 and a server 2530 may be in the form of a data packet transmitted between two or more computer processes.

The system 2500 includes a communication framework 2550 that can be employed to facilitate communications between the client(s) 2510 and the server(s) 2530. The client(s) 2510 are operatively connected to one or more client data store(s) 2520 that can be employed to store information local to the client(s) 2510. Similarly, the server(s) 2530 are operatively connected to one or more server data store(s) 2540 that can be employed to store information local to the servers 2530.

It is to be appreciated and understood that components (e.g., holographic generator component, hologram processor component, display component, processor component, data store, etc.), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). As used and defined herein, the term "computer-readable storage device" excludes transitory storage media. Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   at least one memory that stores computer-executable components; and
   at least one processor that executes or facilitates execution of the computer executable components, comprising:
   a holographic generator component that receives or generates a complex hologram that represents an object scene, wherein the complex hologram comprises a plurality of pixels, wherein the complex hologram comprises a magnitude portion and a phase portion; and
   a hologram processor component that converts a complex value of a pixel of the plurality of pixels to a phase value and performs an error diffusion process to facilitate diffusion of an error associated with the complex value being converted to the phase value to facilitate generation of a phase hologram that corresponds to the complex hologram, wherein the error diffusion process is a bidirectional error diffusion process employed to mitigate a correlated error related to the error and a holographic signal associated with the phase hologram, wherein the plurality of pixels of the complex hologram are arranged in a set of rows, comprising a first row that comprises a first subset of pixels of the plurality of pixels and a second row that comprises a second subset of pixels of the plurality of pixels, wherein, in accordance with the bidirectional error diffusion process, the hologram processor component scans the first subset of pixels of the first row proceeding in a first direction from a first pixel of the first subset at one side of the first row to a first end-row pixel of the first subset at another side of the first row, and scans the second subset of pixels of the second row in a second direction proceeding from an initial pixel of the second subset at a side of the second row to a second end-row pixel of the second subset at an opposite side of the second row, wherein the second direction is opposite to the first direction, and wherein, to facilitate the mitigation of the correlated error, the hologram processor component, via scanning employed in accordance with the bidirectional error diffusion process, interrupts a first correlated error associated with the first subset of pixels of the first row resulting from first complex values of the first subset of pixels being converted to first phase values to mitigate introduction of the first correlated error into the second subset of pixels of the second row.

2. The system of claim 1, wherein the hologram processor component scans the pixel to facilitate the conversion of the complex value of the pixel to the phase value.

3. The system of claim 1, wherein the hologram processor component modifies a magnitude value of the complex value of the pixel to a defined value to facilitate the conversion of the complex value of the pixel to the phase value.

4. The system of claim 1, wherein the second row is adjacent to the first row.

5. The system of claim 1, wherein, in accordance with the bidirectional error diffusion process, the first pixel of the first row is adjacent to the second end-row pixel of the second row, and the first end-row pixel of the first row is adjacent to the initial pixel of the second row.

6. The system of claim 5, wherein in accordance with the bidirectional error diffusion process, the hologram processor component scans the first subset of pixels of the first row proceeding in the first direction from the first pixel of the first subset at the one side of the first row up through the first end-row pixel at the other side of the first row, and, after scanning the first end-row pixel of the first row, scans the second subset of pixels of the second row in the second direction beginning with and proceeding from the initial pixel at the side of the second row to facilitate an interruption of a recursive process at the other side of the first row, wherein the recursive process is associated with scanning of the first subset of pixels of the first row and relates to the correlated error.

7. The system of claim 1, wherein the hologram processor component determines a subset of neighbor pixels of the plurality of pixels, wherein the subset of neighbor pixels comprises neighbor pixels that are in proximity to the pixel in the complex hologram and have not been scanned.

8. The system of claim 7, wherein the hologram processor component updates respective complex values of the neighbor pixels of the subset of neighbor pixels, based at least in part on the error, to facilitate the diffusion of the error to the neighbor pixels.

9. The system of claim 1, wherein the hologram processor component determines that a specified pixel of the plurality of pixels is a dead pixel based at least in part on the specified pixel being determined to be opaque, being determined to be transparent with no phase shift, or being determined to have a constant phase shift.

10. The system of claim 9, wherein the hologram processor component modifies a value associated with the dead pixel based at least in part on a determination of whether the dead pixel is opaque, a determination of whether the dead pixel is transparent, a determination of whether there is a phase shift associated with the dead pixel, or a determination of whether there is a constant amount of phase associated with the dead pixel.

11. The system of claim 1, wherein the hologram processor component modifies at least one of a coefficient value associated with an update of a particular complex value of a neighbor pixel that is in proximity to the pixel in the complex hologram, or a weighting value associated with the update of the particular complex value of the neighbor pixel, based at least in part on a number of neighbor pixels in proximity to the pixel that are determined to be dead pixels.

12. The system of claim 1, wherein the computer-executable components further comprise a display component that facilitates display of a holographic image based at least in part on the phase hologram.

13. The system of claim 12, wherein the display component comprises a phase-only display device.

14. The system of claim 13, wherein the display component comprises at least one of a phase-only spatial light modulator display device, a phase-only liquid crystal on silicon display device, or a phase-only liquid crystal display device.

15. The system of claim 1, wherein the object scene is a real or synthesized three-dimensional object scene, the complex hologram is a full-parallax three-dimensional hologram that represents the real or synthesized three-dimensional object scene, and the holographic image is a three-dimensional full-parallax holographic image based at least in part on the phase hologram.

* * * * *